(12) United States Patent
Kawakami et al.

(10) Patent No.: US 11,477,507 B2
(45) Date of Patent: Oct. 18, 2022

(54) CONTENT DISTRIBUTION SYSTEM, CONTENT DISTRIBUTION METHOD, AND COMPUTER PROGRAM

(71) Applicant: DWANGO Co., Ltd., Tokyo (JP)

(72) Inventors: Nobuo Kawakami, Tokyo (JP); Shinnosuke Iwaki, Tokyo (JP); Takashi Kojima, Tokyo (JP); Toshihiro Shimizu, Tokyo (JP); Hiroaki Saito, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 17/059,314

(22) PCT Filed: Jul. 24, 2019

(86) PCT No.: PCT/JP2019/029106
§ 371 (c)(1),
(2) Date: Nov. 27, 2020

(87) PCT Pub. No.: WO2020/022404
PCT Pub. Date: Jan. 30, 2020

(65) Prior Publication Data
US 2021/0204014 A1    Jul. 1, 2021

(30) Foreign Application Priority Data
Jul. 25, 2018 (JP) .............................. JP2018-150864

(51) Int. Cl.
*G06F 13/00*        (2006.01)
*H04N 21/2743*     (2011.01)
(Continued)

(52) U.S. Cl.
CPC ......... *H04N 21/2743* (2013.01); *G06F 13/00* (2013.01); *G06V 40/103* (2022.01); *G06V 40/23* (2022.01); *H04N 21/2187* (2013.01)

(58) Field of Classification Search
CPC ........... H04N 21/2743; H04N 21/2187; H04N 21/258; H04N 21/4223; H04N 21/44012;
(Continued)

(56) References Cited

U.S. PATENT DOCUMENTS

2002/0080094 A1 * 6/2002 Biocca ................ H04N 13/344
                                                                    345/8
2010/0285877 A1 * 11/2010 Corazza ................. A63F 13/52
                                                                    463/32
(Continued)

FOREIGN PATENT DOCUMENTS

JP       4637889 B2    2/2011
JP       2012-120098 A    6/2012
(Continued)

OTHER PUBLICATIONS

Translation of International Search Report and Written Opinion dated Sep. 17, 2019 in corresponding application No. PCT/JP2019/029106; 7 pgs.
(Continued)

*Primary Examiner* — Tuyetlien T Tran
(74) *Attorney, Agent, or Firm* — Maier & Maier, PLLC

(57) ABSTRACT

The present disclosure has a configuration in which a distributor who performs a separate distribution that is different from this live content, or a viewer who views this separate distribution can participate in a virtual space and express intent or participate in visual recognition through the commitment of a virtual item.

9 Claims, 30 Drawing Sheets

(51) Int. Cl.
*H04N 21/2187* (2011.01)
*G06V 40/20* (2022.01)
*G06V 40/10* (2022.01)

(58) Field of Classification Search
CPC ........... H04N 21/4788; H04N 21/8146; H04N 21/816; G06K 9/00342; G06K 9/00369; G06T 19/00; G06F 13/00; G06V 40/103; G06V 40/23; G06V 20/20
See application file for complete search history.

(56) References Cited

U.S. PATENT DOCUMENTS

| | | | | |
|---|---|---|---|---|
| 2010/0287485 | A1* | 11/2010 | Bertolami | G06F 3/011 715/764 |
| 2013/0009984 | A1* | 1/2013 | Kawakami | H04N 7/157 345/619 |
| 2014/0218361 | A1* | 8/2014 | Abe | A63F 13/42 345/424 |
| 2019/0313059 | A1* | 10/2019 | Agarawala | G06F 3/011 |
| 2021/0166479 | A1* | 6/2021 | Fukumoto | G06F 3/011 |

FOREIGN PATENT DOCUMENTS

| | | |
|---|---|---|
| JP | 2016-167727 A | 9/2016 |
| JP | 2017-121021 A | 7/2017 |
| JP | 6469279 B1 | 2/2019 |

OTHER PUBLICATIONS

Decision to Grant a Patent dated Jul. 14, 2020 in corresponding application No. 2018-150864; 5 pgs.
Decision of Refusal dated Mar. 10, 2020 in corresponding application No. 2018-150864; 2 pgs.
Notice of Reasons for Refusal dated Aug. 6, 2019 in corresponding application No. 2018-150864; 14 pgs.

* cited by examiner

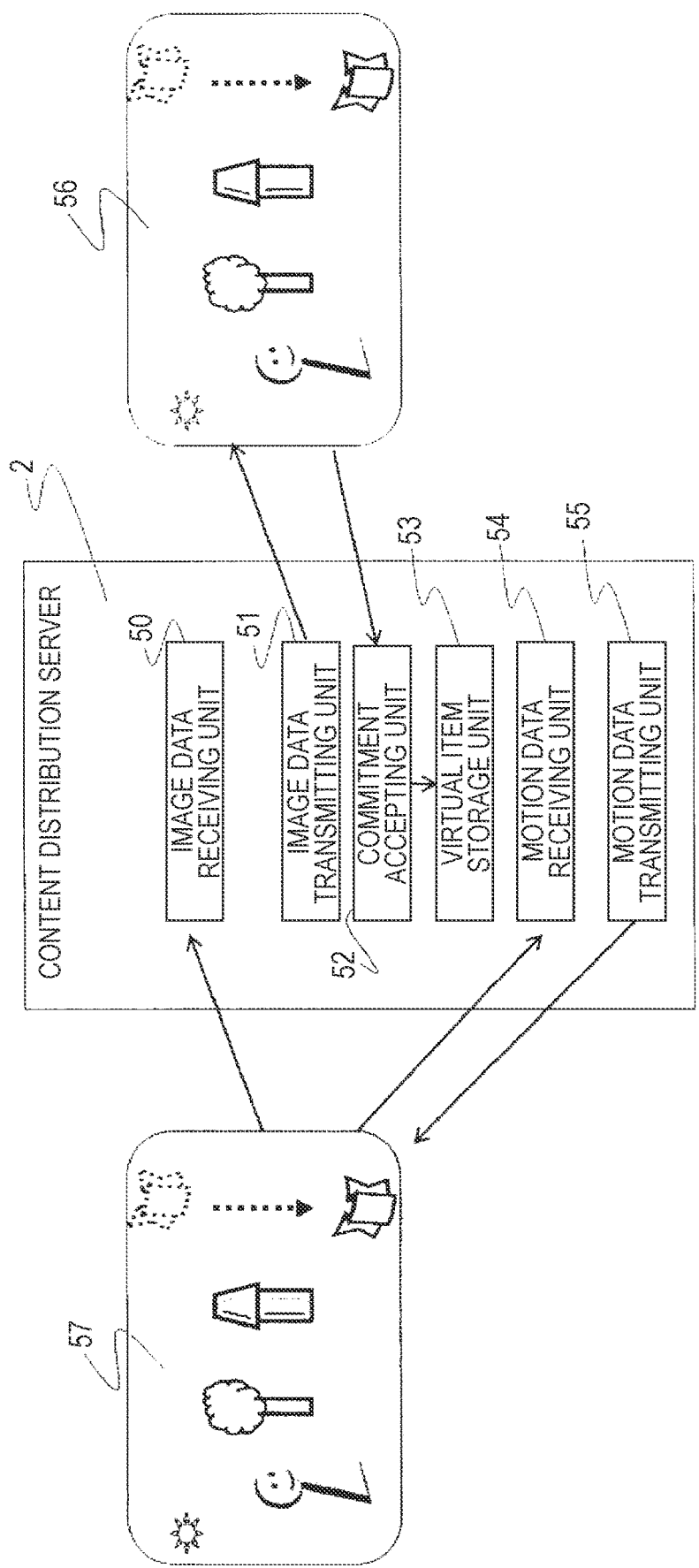

CONTENT DISTRIBUTION SYSTEM, CONTENT DISTRIBUTION METHOD, AND COMPUTER PROGRAM

FIELD

The present disclosure relates to a content distribution system, a content distribution method, and a computer program.

ART

Recently, a service for distributing a live content through a network has prevailed as internet live broadcasting. In such internet live broadcasting, a technology has been proposed in which a distributor appears in a virtual space as a virtual character (an avatar), and an image thereof is distributed as a live content. In such a live content, an image in which the operation of the distributor is synthesized as the operation of the virtual character is distributed by a motion capture technology.

For example, in Patent Document 1, a configuration is disclosed in which a three-dimensional space image from a free viewpoint including the viewpoint of a third person is generated by allowing an avatar on a virtual space to act the own behavior, and thus, a video is prepared without inconvenience of carrying photographic equipment in the actual space, cumbersomeness of asking the other person to take a photograph, or the like.

In addition, in Patent Document 2, it is proposed that when live performance is performed in the real world, a performer can be even more excited by giving a celebration or flowers to the performer, and according to this, even in a video sharing service, in order to obtain the same effect, a virtual item purchased by a viewer of a content (indicating a "broadcasting program" in which a video is shared between viewers, such as a live content) is managed in association with the content, and is used as an item for decorating a display screen of the content. As the virtual item, for example, the viewer of the content purchases flowers, letters, logos, and the like as a "decoration", and disposes the flowers, the letters, the logos, and the like in any position on the display screen, and thus, decorates the display screen.

CITATION LIST

Patent Document

Patent Document 1: Japanese Patent No. 4,637,889
Patent Document 2: JP-A-2012-120098

SUMMARY

However, in a technology of the related art relevant to a system in which a viewer performs commitment of a virtual item such as a decoration with respect to a virtual space in the internet live broadcasting or the like using the virtual space, the following serious problems have not been solved yet.

In the case of using the decoration described above as an example, it is considered that a performer or a relevant person of a live content (a singer, a dancer, a player, a lecturer, a director, a stage director, a producer, a sponsor, and the like) wants the live content to be viewed by a wider range of viewers and a virtual item as a symbol of support, compliment, or praise, such as the decoration of the patent document described above, to be displayed on a content screen when the contents are supported.

Further, it is desirable that a symbol item of the support such as the decoration that is displayed with an effort is visually recognized by a wider range of viewers, and the support is more widespread.

However, in the configuration disclosed in Patent Document 2 described above, the viewer capable of performing the commitment of the decoration is only a viewer who has been watching the content voluntarily, and thus, it is difficult to obtain the commitment of the decoration that is the symbol of the support from a wider range of targets.

Similarly, in the configuration disclosed in Patent Document 2 described above, only the viewer who has been watching the live content voluntarily just watches the decoration subjected to the commitment by the other viewer in the live content, and thus, it is not possible to assume that the decoration is visually recognized by a wider range of targets and the circle of support is widespread.

The present invention has been made in consideration of the circumstances described above, and an object thereof is to provide a content distribution system, a content distribution method, and a computer program, in which it is possible to obtain the commitment of a virtual item that is a symbol of support with respect to a live content from a wider range of target people not limited to a viewer of a live content that is a target, it is possible for a wider range of target people not limited to the viewer of the live content to visually recognize the virtual item that is the symbol of the support, and it is possible to make the circle of support with respect to the live content widespread.

In order to attain the object described above, the present invention provides a content distribution system, a content distribution method, and a computer program according to 1) to 7) described below.

1)

A content distribution system characterized by including:

a participation accepting unit accepting a participation request of a distributor of the other live content with respect to a virtual space that is used in distribution by a distributor of a live content;

an information acquisition unit acquiring motion information indicating a movement of each of the distributor of the live content and the distributor of the other live content, and information of each virtual character;

an image distribution unit distributing images of the virtual space and each of the virtual characters to a viewer of the live content and a viewer of the other live content, on the basis of each of the information items acquired by the information acquisition unit; and a commitment accepting unit accepting commitment of a new virtual item with respect to the virtual space by each of the distributors or each of the viewers, in which the distribution of the virtual space and each of the virtual characters is performed by including an image of the new virtual item subjected to the commitment.

2)

The content distribution system according to 1), characterized in that the new virtual item subjected to the commitment includes motion information that is movement information, and the motion information is used in the distribution performed by the image distribution unit.

3)

The content distribution system according to 2), characterized in that the motion information indicating the movement of each of the distributor of the live content and the distributor of the other live content, and the motion information that is the movement information of the new virtual item subjected to the commitment are stored and/or transmitted by a common configuration unit.

4)
A content distribution method characterized by including:
a participation accepting step of accepting a participation request of a distributor of the other live content with respect to a virtual space that is used in distribution by a distributor of a live content;
an information acquisition step of acquiring motion information indicating a movement of each of the distributor of the live content and the distributor of the other live content, and information of each virtual character;
an image distribution step of distributing images of the virtual space and each of the virtual characters to a viewer of the live content and a viewer of the other live content, on the basis of each of the information items acquired in the information acquisition step; and
a commitment accepting step of accepting commitment of a new virtual item with respect to the virtual space by each of the distributors or each of the viewers,
in which the distribution of the virtual space and each of the virtual characters is performed by including an image of the new virtual item subjected to the commitment.

5)
The content distribution method according to 4), characterized in that the new virtual item subjected to the commitment includes motion information that is movement information, and the motion information is used in the distribution performed in the image distribution step.

6)
The content distribution method according to 5), characterized in that the motion information indicating the movement of each of the distributor of the live content and the distributor of the other live content, and the motion information that is the movement information of the new virtual item subjected to the commitment are stored and/or transmitted by a common configuration unit.

7)
A computer program for allowing a computer to execute:
each of the steps of the content distribution method according to any one of 4) to 6).

According to this disclosure, it is possible to provide a content distribution system, a content distribution method, and a computer program, in which it is possible to obtain the commitment of a virtual item that is a symbol of support with respect to a live content from a wider range of target people not limited to a viewer of a live content that is a target, it is possible for a wider range of target people not limited to the viewer of the live content to visually recognize the virtual item that is the symbol of the support, and it is possible to make the circle of support with respect to the live content widespread.

BRIEF DESCRIPTION OF THE DRAWINGS

FIG. 31 is a diagram illustrating a configuration of the content distribution server or the like, in the content distribution receiving system of the present invention.

DETAILED DESCRIPTION

Hereinafter, an embodiment according to the present disclosure will be described. Note that, this embodiment described below is merely an example, various modifications can be made within a range not departing from the spirit of the present invention, and such modifications are also included in the present invention.

[Configuration of Content Distribution Receiving System 1]

Figure 1:
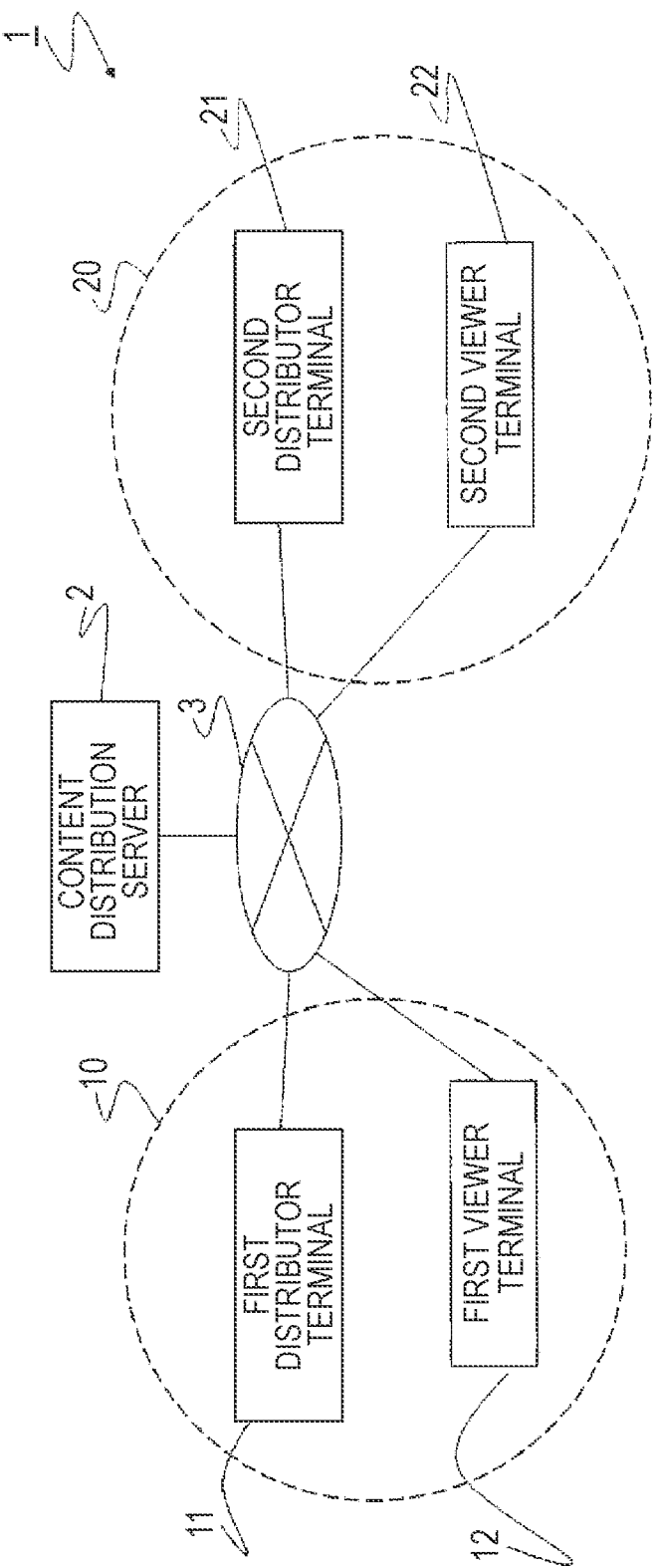
FIG. 1 is a diagram schematically illustrating a configuration of a content distribution receiving system according to the present invention.

FIG. 1 is a diagram schematically illustrating the configuration of a content distribution receiving system 1 according to the present invention.

The content distribution receiving system 1 includes a content distribution server 2, a first distributor terminal 11, a first viewer terminal 12, a second distributor terminal 21, and a second viewer terminal 22, and such configurations are connected to each other through an internet communication network 3 or the other communication network such that data exchange can be performed. The content distribution server 2 is a server configured such that a general-purpose computer is operated by a dedicated computer program.

The first distributor terminal 11 is a personal computer that is used in the distribution of a live content using a first virtual space 30 described below and is used by a distributor staging the live content. The first viewer terminal 12 is a personal computer that is used by a viewer viewing the live content described above, or may be attained by using various information terminals such as a smart phone or a personal digital assistant (PDA).

The second distributor terminal 21 is a personal computer that is used in the distribution of a live content using a second virtual space 40 described below and is used by a distributor staging the live content. The second viewer terminal 22 is a personal computer that is used by a viewer viewing the live content described above, or may be attained by using various information terminals such as a smart phone or a personal digital assistant (PDA).

The first distributor terminal 11 and the first viewer terminal 12 will be collectively referred to as a first content distribution group 10, and similarly, the second distributor terminal 21 and the second viewer terminal 22 will be collectively referred to as a second content distribution group 20. Each of the distribution groups shares each live content distribution stream in each of the groups 10 and 20 at a stage where the common distribution of the live content is not implemented yet.

Note that, in order to simplify and clarify the configuration illustrated in FIG. 1 and the above description, the number of terminals to be configured is limited, but in the implementation, it is obvious that a larger number of distributor terminals, a larger number of viewer terminals, and a larger number of content distribution groups can be included.

[Configuration of Content Distribution Server 2]

Figure 2:
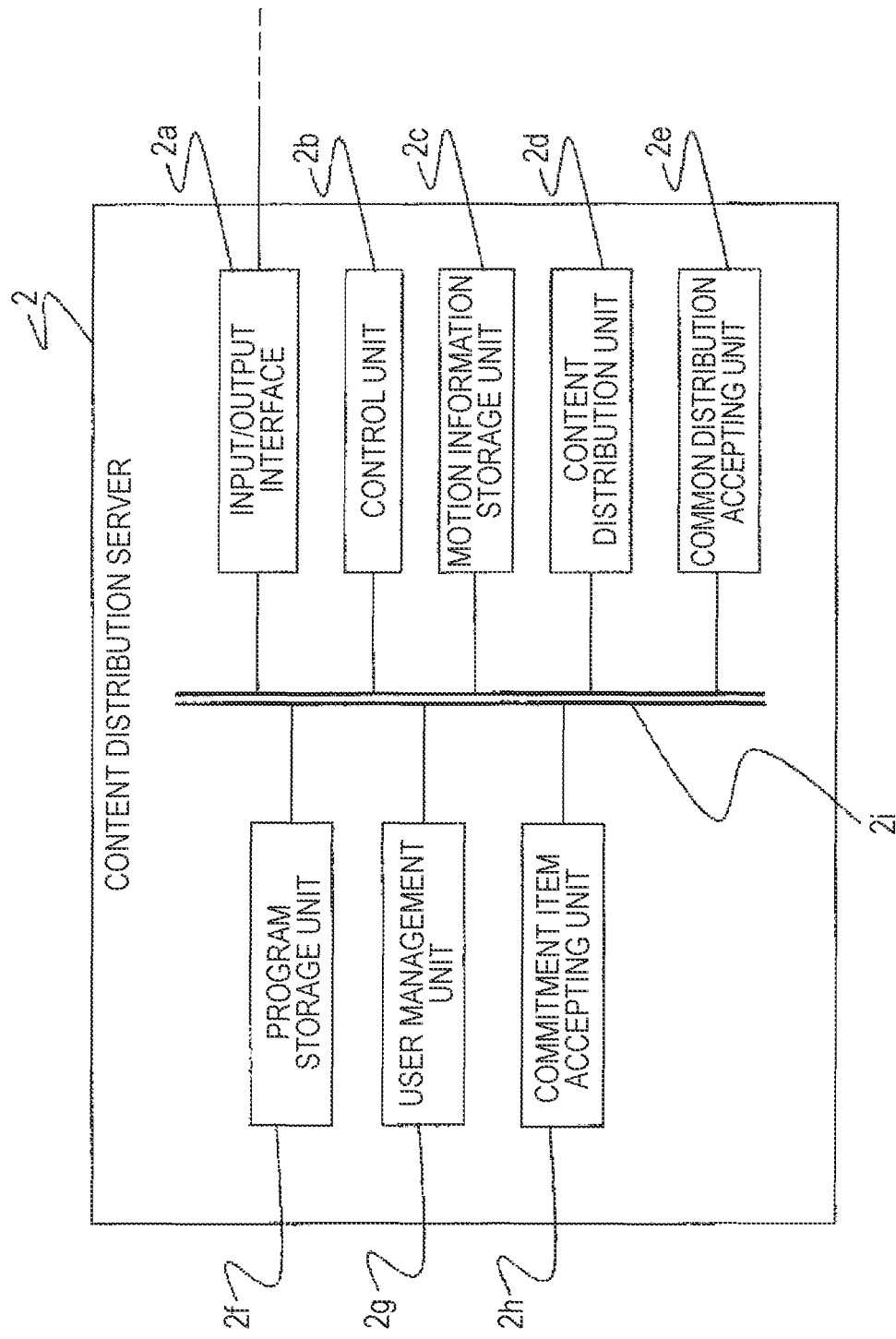
FIG. 2 is a block diagram of a content distribution server of the content distribution receiving system of FIG. 1.

As illustrated in FIG. 2, the content distribution server 2 includes an input/output interface 2a that is a data transmission terminal inside and outside the server, and a control unit 2b that is a central processing unit (CPU) controlling the operation of each configuration of the server 2.

Similarly, a motion information storage unit 2c of the server 2 stores data relevant to a motion of an avatar (a human substitution display object) that is a virtual item, data of the virtual item such as a commitment item, and the like, to be transmitted from each of the distributor terminals or each of the viewer terminals, and as necessary, transmits the data to a necessary transmission destination.

Figure 3:
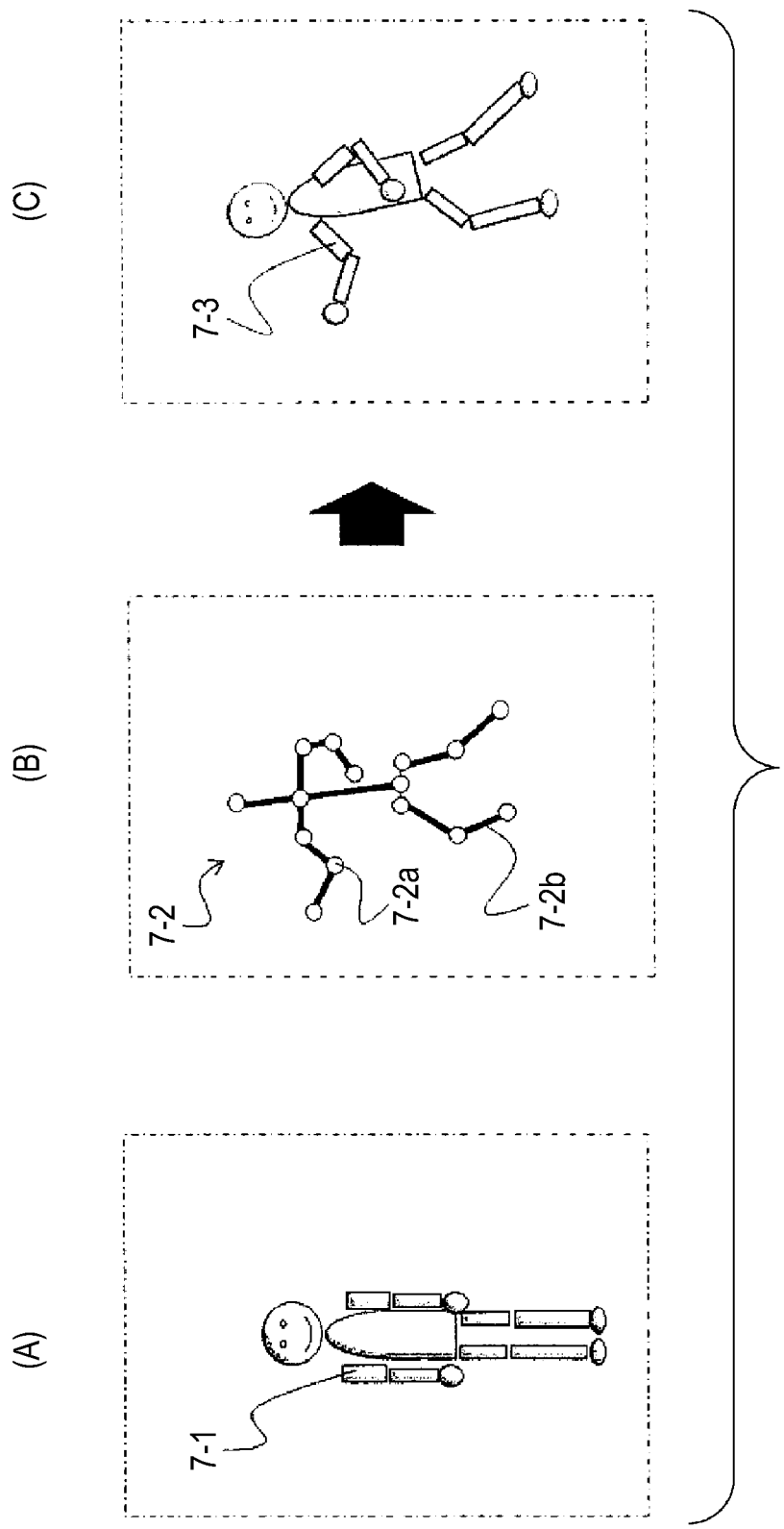
FIG. 3 is a schematic view describing data of an avatar of the content distribution receiving system of FIG. 1.

Specifically, as illustrated in FIG. 3, the motion information storage unit 2c determines whether to prepare appearance data 7-1 of the avatar by the viewer terminal or the like described below or to select appearance data that is prepared and provided by the system, by designating a uniform resource locator (URL) of the appearance data disposed on a network. Then, as motion data 7-2 that is a result of sensing the movement of each part of the body of the viewer or the like, as illustrated in FIG. 3(B), position information and movement information are obtained by using each part of the body as a joint 7-2a. Information of a ramus 7-2b connecting the joints 7-2a may be further generated to clarify a relationship between the joints 7-2a.

A content distribution unit 2d receives a live content generated in an image by each of the distributor terminals or the like performing a rendering operation, and transmits the live content to each terminal that has requested viewing to be provided to the viewing. For example, as illustrated in FIG. 3(C), in the rendering with respect to the avatar, the position or the movement of each part of the appearance data 7-1 is obtained from the motion data 7-2, and rendering data 7-3 of the avatar indicating the current position or the current movement of the avatar is generated. Note that, the rendering can be performed by using the appearance data 7-1 of the avatar that is still image data, and the data of the joint 7-2a or the ramus 7-2b, but not a video, and thus, the appearance data 7-1 is the still image data and has small data capacity, the data of the joint 7-2a or the ramus 7-2b is coordinate data or motion vector data of the limited number of points but not image data and has small capacity, and as a result thereof, it is possible to extremely decrease a load on a transmission path or hardware necessary for the transmission, the reception, the storage, or the rendering of the data. Further, insofar as the appearance data 7-1 of the avatar is designated by a uniform resource locator (URL) but not raw image data, it is possible to perform the transmission or the storage with smaller letter string data. Advantages thereof are to obtain the same effect regardless of which configuration of the system the appearance data or the motion data is generated, transmitted, stored, and rendered with, and are the common effect at the time of rendering the virtual object not limited to a human avatar. Note that, in the attached drawings, a schematic view of the avatar illustrated in each part is simply displayed, and the movement of four extremities are not written, but such illustration indicates the rendering data 7-3 of the avatar as illustrated in FIG. 3(C).

As described below, a common distribution accepting unit 2e accepts an application for common distribution of the other live content during the current distribution, from a distributor terminal that is used by a distributor who stages and distributes a certain live content, and generates and transmits information for requesting the common distribution to a terminal of the other distributor staging the other live content.

A program storage unit 2f stores a program for attaining each execution operation of the server 2.

A user management unit 2g retains information of the distributor terminal that is used by the distributor staging each live content described above, the viewer terminal that is used by the viewer viewing the live content, and the distributor terminal that is used by the other distributor performing the common distribution of the live content and the viewer terminal that is used by the viewer thereof, as data such as an internet protocol (IP) address, and thus, it is possible to find which terminal a certain live content is transmitted to by using the information stored in the user management unit 2g, and therefore, in the this system 1, a suitable live content is transmitted to a suitable terminal.

In addition, the user management unit 2g also records information such as the history of a virtual item subjected to commitment in a virtual space that is used by each of the live contents, and the type of item.

A commitment item accepting unit 2h accepts the commitment of a virtual item indicating support or praise with respect to the live content, from the terminal viewing the live content, and transmits the information of the virtual item to the distributor terminal staging the live content of the other person performing the commitment. As a result thereof, the virtual item subjected to the commitment is displayed on a display screen of the live content subjected to the commitment.

A bus line 2i connects the configurations of the server 2 to each other such that data exchange can be performed.

The first distributor terminal 11 and the second distributor terminal 21 have a common configuration, and hereinafter, the first distributor terminal 11 will be described as an example.

[Configuration of First Distributor Terminal 11]

Figure 4:
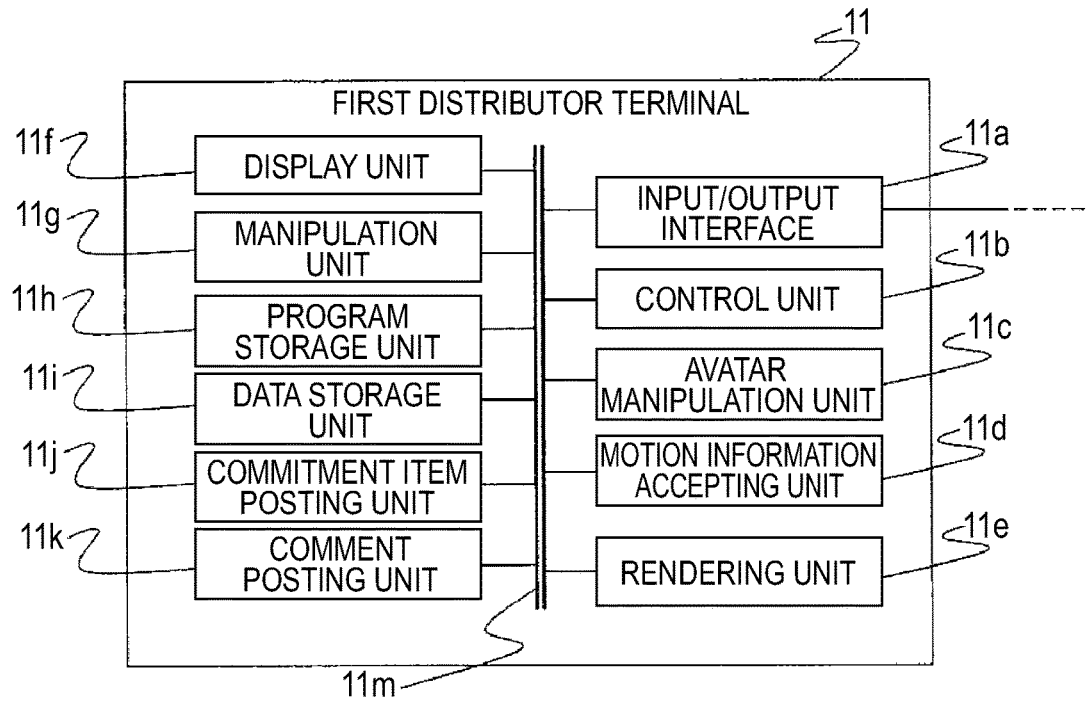
FIG. 4 is a block diagram of a first distributor terminal of the content distribution receiving system of FIG. 1.

As illustrated in FIG. 4, first, the first distributor terminal 11 includes an input/output interface 11a that is an information input/output terminal inside and outside the terminal, and a control unit 11b that is CPU controlling each configuration of the terminal 11.

In order for the distributor to allow an avatar that is the own virtual alter ego to appear in the virtual space and to perform a desired motion, an avatar manipulation unit 11c acquires the motion data by using data obtained by photographing the own movement with an acceleration sensor or a 3D camera mounted on the own body, or data obtained by sensing the movement of each part of the own body with a Doppler sensor, and transmits the motion data to the server 2.

In order to attain the common distribution of the live content, a motion information accepting unit 11d stores the motion data of the other distributor, received from the distributor terminal through the server 2, or the viewer, and uses the motion data in the rendering. Note that, in addition to the common distribution, in a case where the participation of the avatar is applied from the viewer of the live content that is staged by the distributor, the motion data of the avatar of the viewer is received and recorded, and is used in the rendering of the live content. In addition, the motion information accepting unit 11d also receives and stores the information of the virtual item subjected to the commitment from the other distributor or the viewer to be provided for the rendering of the live content as with the avatar, and thus, even in the commonly distributed live content, the virtual item subjected to the commitment can be viewed by a wide range of target people including a viewer of a distribution group of a common distribution destination.

A rendering unit 11e performs drawing (rendering) for visualizing the virtual space by using the motion data of the avatar, the data of the virtual item subjected to the commitment, a background image of the virtual space, and the data of the virtual item disposed in the virtual space, and transmits the obtained image of the virtual space to the server 2 as the live content to be provided for the distribution.

A display unit 11f performs screen display in order for the distributor to view the live content or in order to perform various manipulations, and is attained by a display panel of a personal computer, a goggle-type head mount display (HMD) mounted on the face, and the like.

A manipulation unit 11g is used by the distributor to manipulate various operations, and may be a keyboard of a personal computer, a mouse, and a touch panel, or may be a device that is manipulated by motion data of a manipulator. A program storage unit 11h may store a computer program necessary for the distribution or the viewing of the live content, and may include a general-purpose computer operating system (OS), an internet browsing program (a browser), and the like. A data storage unit 11i stores background data of the virtual space used in the live content, the data of the virtual item, and the like.

In order for the commitment of the virtual item in the other live content or the like that is commonly distributed by the distributor, a commitment item posting unit 11j stores the data of the virtual item, but the distributor terminal 11 may be used as the viewer terminal 12, in accordance with the situation, and thus, is disposed as with the viewer terminal 12. A comment posting unit 11k has a configuration for posting a comment that is letter information displayed over the display screen of the live content to the server 2. A bus line 11m connects the configurations of the distributor terminal 11 to each other such that data exchange can be performed.

The first viewer terminal 12 and the second viewer terminal 22 have a common configuration, and hereinafter, the first viewer terminal 12 will be described as an example.

[Configuration of First Viewer Terminal 12]

Figure 5:
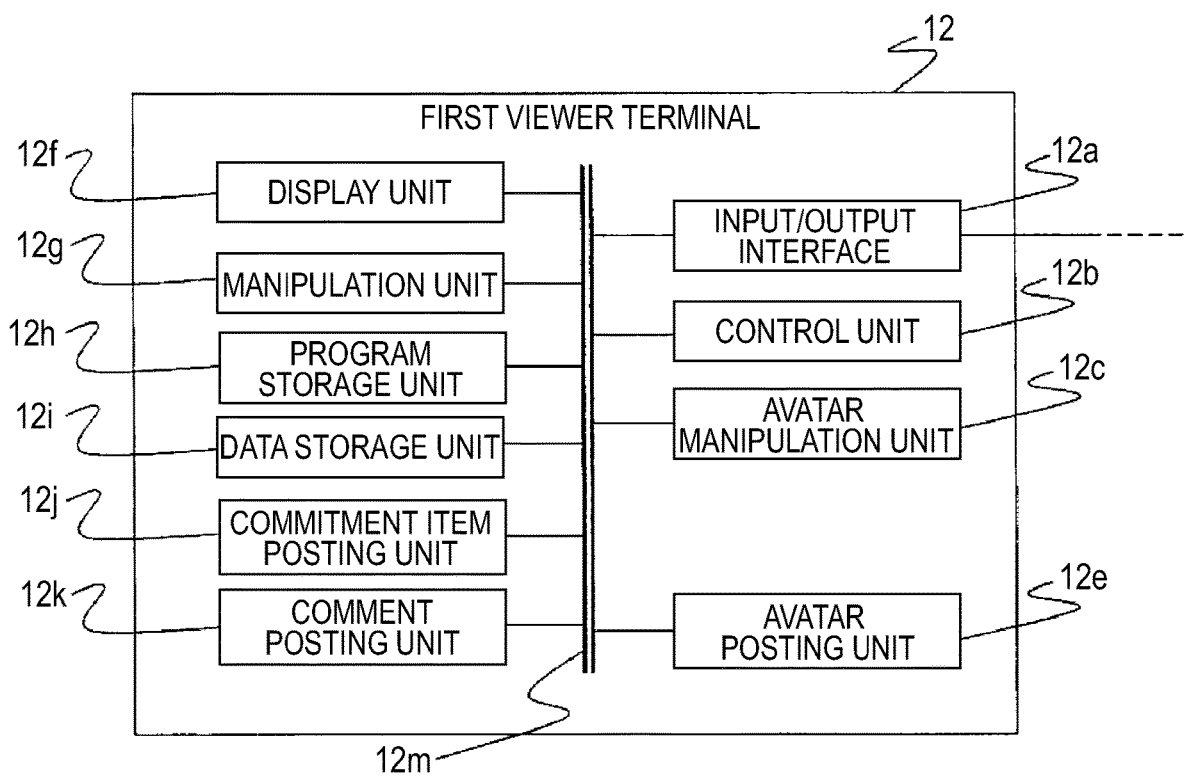
FIG. 5 is a block diagram of a first viewer terminal of the content distribution receiving system of FIG. 1.

As illustrated in FIG. 5, the first viewer terminal 12 includes an input/output interface 12a that is a data transmission and reception terminal inside and outside the terminal 12, and a control unit 12b that is a central processing unit (CPU) controlling each part of the terminal 12.

In order for the distributor to allow an avatar that is the own virtual alter ego to appear in the virtual space and to perform a desired motion, an avatar manipulation unit 12c acquires the motion data by using data obtained by photographing the own movement with an acceleration sensor or a 3D camera mounted on the own body, or data obtained by sensing the movement of each part of the own body with a Doppler sensor, and transmits the motion data to the server 2.

In order for the viewer to allow the own avatar to appear in the live content that the viewer is viewing, an avatar posting unit 12e is used for posting the appearance data of the avatar or the motion data described above to the server 2.

A display unit 12f performs screen display in order for the viewer to view the live content or in order to perform various manipulations, and is attained by a display panel of a personal computer, a goggle-type head mount display (HMD) mounted on the face, and the like.

A manipulation unit 12g is used by the viewer to manipulate various operations, and may be a keyboard of a personal computer, a mouse, and a touch panel, or may be a device that is manipulated by the motion data of the manipulator. A program storage unit 12h may store a computer program necessary for the viewing of the live content, and may include a general-purpose computer operating system (OS), an internet browsing program (a browser), and the like. A data storage unit 12i stores various data items.

In order for the commitment of the virtual item in the live content that the viewer is viewing, a commitment item posting unit 12j stores the data of the virtual item. A comment posting unit 12k has a configuration for posting a comment that is the letter information displayed over the display screen of the live content to the server 2. A bus line 12m connects the configurations of the viewer terminal 12 to each other such that data exchange can be performed.

Figure 6:
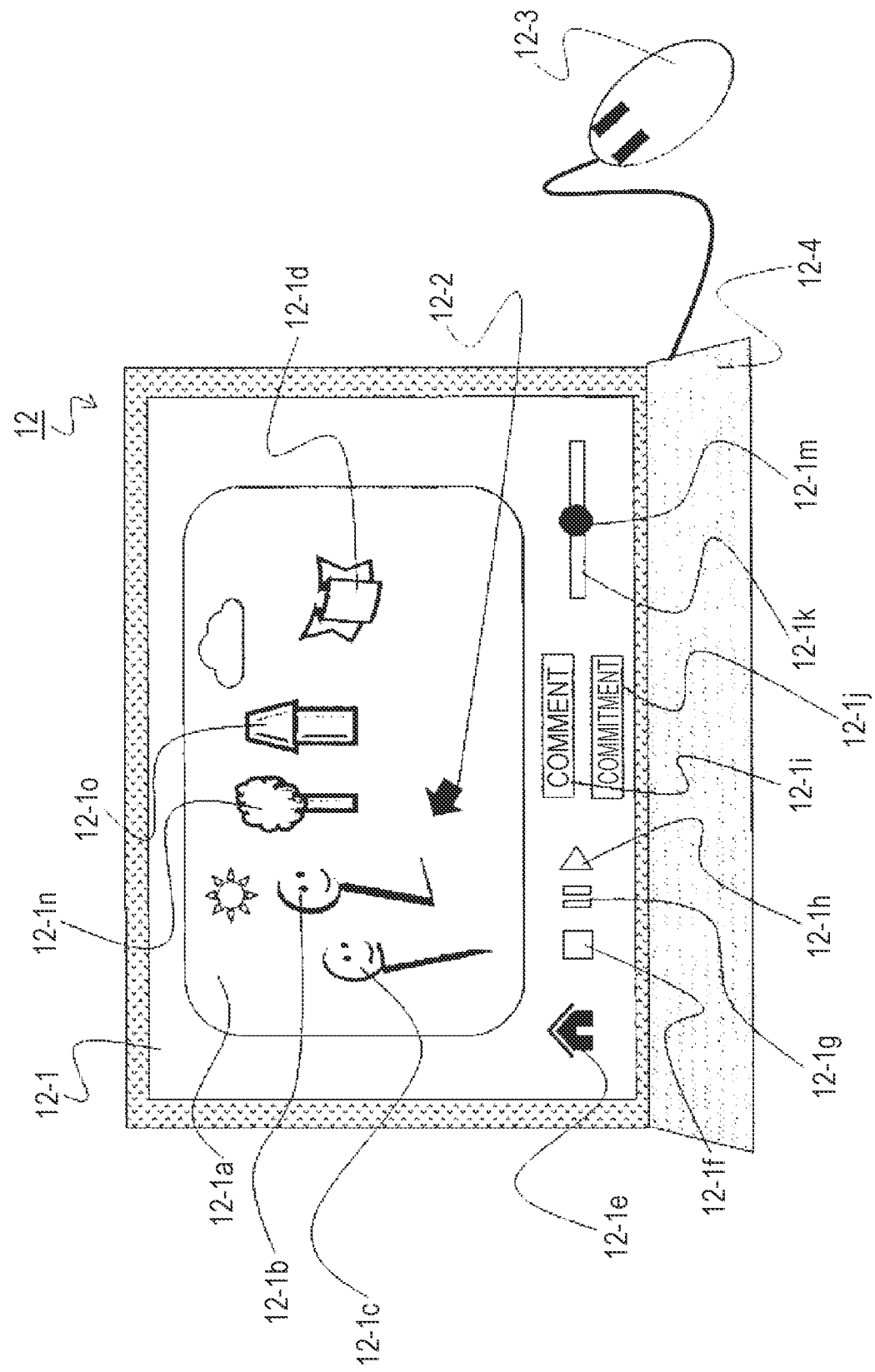
FIG. 6 is a schematic external view of the first viewer terminal of FIG. 5.

FIG. 6 schematically illustrates an appearance in the case of attaining the first viewer terminal 12 by a personal computer, and in a case where the viewer performs connection with respect to the server 2 by inputting a uniform resource locator (URL) known in advance, in order to use the service of the this system 1, necessary data and a JavaScript (Registered Trademark) program are sent from the server 2, and a portal screen of a video distribution service is displayed on a display panel 12-1 displaying various images, a still image, a moving image, or letter information.

The viewer selects in advance a live content that the viewer wants to view from a display list (not illustrated), and FIG. 5 illustrates a situation in which the contents of the live content (the broadcasting program) are currently displayed. Here, in order to avoid cumbersome illustration, the comment that is the letter information posted from each viewer viewing the live content is not illustrated in FIG. 6.

In FIG. 6, the display panel 12-1 includes a video display area 12-1a for displaying a live content video, and in the video display area 12-1a, an avatar 12-1b of a first distributor, an avatar 12-1c of a second distributor who performs the common distribution, a first commitment item 12-1d representing a ribbon-type appearance, which is subjected to the commitment from any viewer viewing the live content in order for the support, the praise, or the like with respect to the live content, and a tree 12-1n and a house 12-1o that are a virtual item disposed in a virtual space in which the live content is used are displayed.

Similarly, a home button display 12-1e for returning to a portal page (not illustrated) of the video distribution service, a reproduction stop button display 12-f used in a case where the content that is being viewed is not the live broadcasting but the reproduction content, a pause button display 12-1g, and a reproduction button display 12-1h are respectively displayed on the display panel 12-1.

A comment posting button display 12-1i in the display panel 12-1 is a button for posting the comment described above with respect to the content that the viewer is viewing, and similarly, an item commitment button display 12-1j is a button for a commitment action of the virtual item for indicating the support, the praise, or the like with respect to the content during the viewing.

In a case where the content is the reproduction content, in a seek bar display 12-1k, the position of a seek button display 12-1m indicates the current reproduction time by allowing a reproduction start time to correspond to the left end and a reproduction end time to correspond to the right end, and it is possible to move the position of the seek button display 12-1m to a time that the viewer wants to perform the reproduction, with a mouse pointer 12-3. As the manipulation unit 12g described above, there are the mouse pointer 12-3 and a mouse cursor 12-2, and a keyboard 12-4 is also provided in the viewer terminal 12.

Figure 7:
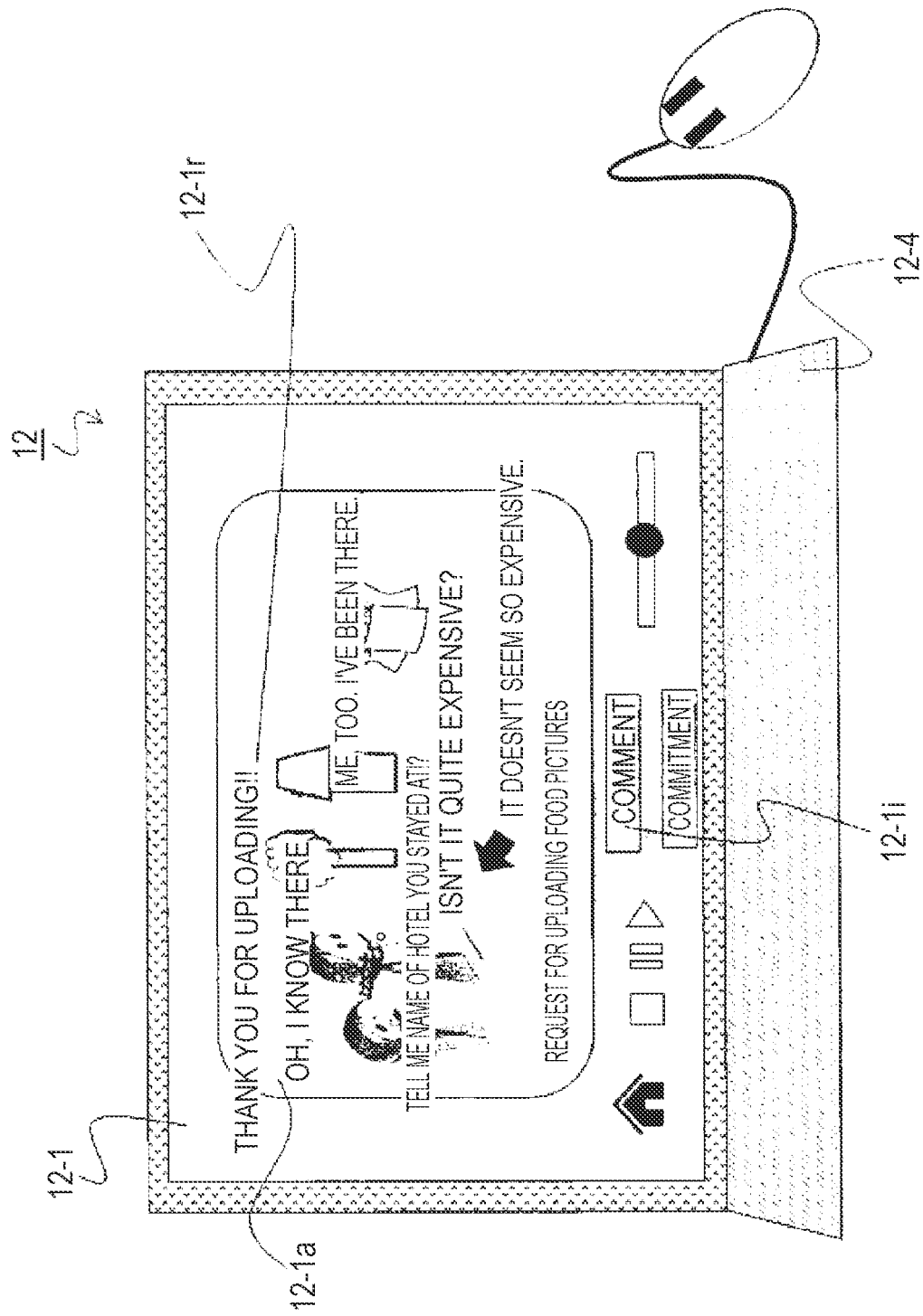
FIG. 7 is a diagram including display of a comment in the schematic external view of FIG. 6.

FIG. 7 illustrates a situation in which a comment 12-1r is further displayed in the display panel 12-1, on the viewer terminal 12 illustrated in FIG. 6, and the comment 12-1r of the contents such as "Thank you for uploading!!", "Oh, I know there", "Me, too.", "I've been there.", "Tell me the name of the hotel you stayed at!?", "Isn't it quite expensive?", "It doesn't seem so expensive.", and "Request for uploading food pictures" appears from the right end of the display panel 12-1, is moved to the left end by scroll movement, and disappears. A range in which the comment 12-1r is displayed is larger than the video display area 12-1a for displaying the live content video and is set to extend over the video display area 12-1a, and thus, the viewer is capable of clearly understanding that the comment 12-r is not the original contents of a content, but is posted from a separate poster.

[Distribution and Viewing of Content]

Next, an operation until the live content that is posted and distributed from the first distributor terminal 11 is viewed by the first viewer terminal 12 will be described by using each of a signal-flow graph of FIG. 7, a schematic view of the first virtual space of FIG. 9, and a diagram of a rendering result seen from each viewpoint of FIG. 10.

A distributor who plans to stage and distribute a live content applies content distribution to the server 2 by using the first distributor terminal (step S101). In a case where the server 2 permits the distribution, the permission is notified to the first distributor terminal 12 from the server 2 (step S102), and the server 2 displays the live content as a content that can be viewed on a suitable page of a distribution service site (step S103).

Figure 9:
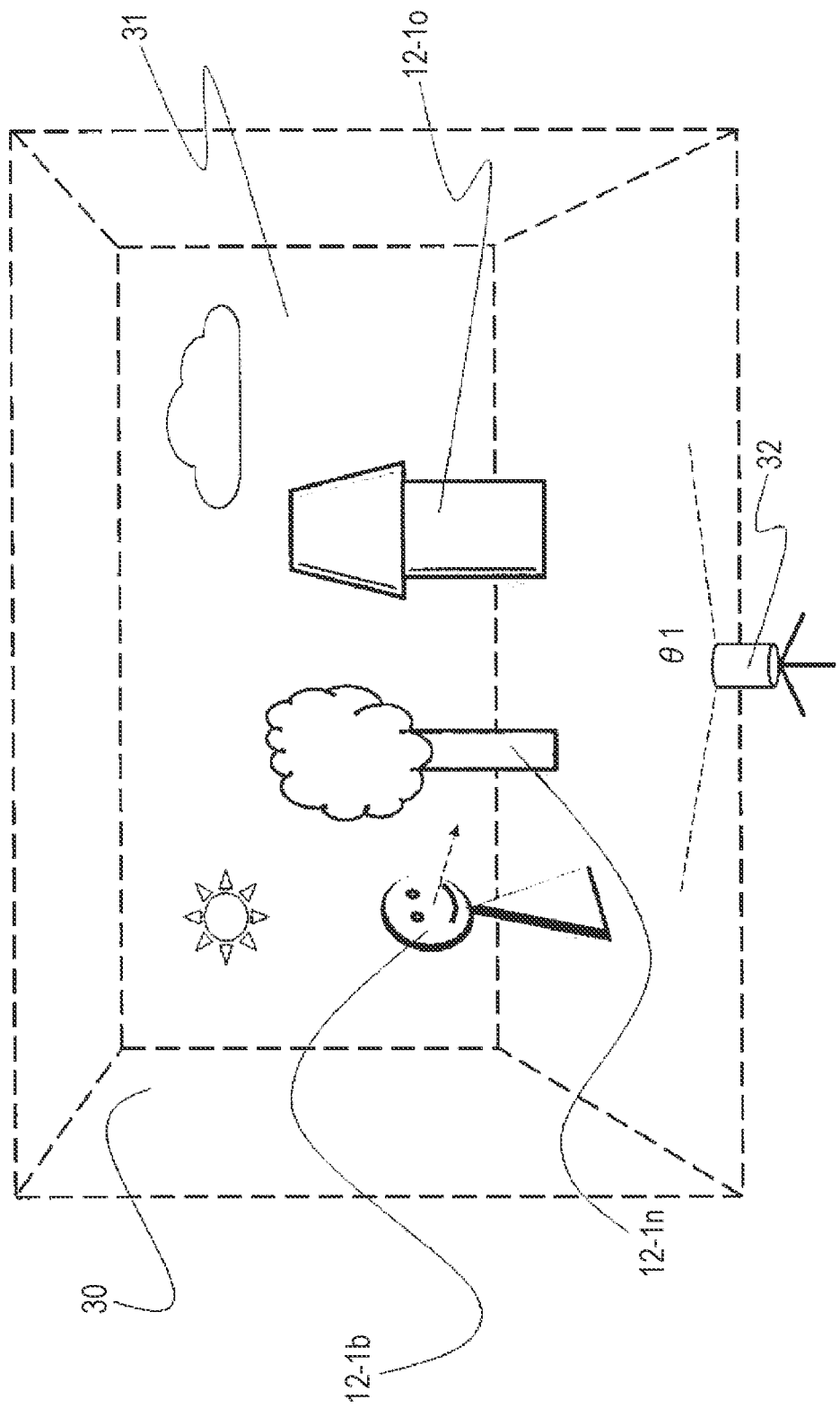
FIG. 9 is a schematic view of a first virtual space before the common distribution, in the content distribution receiving system of the present invention.
Figure 10:
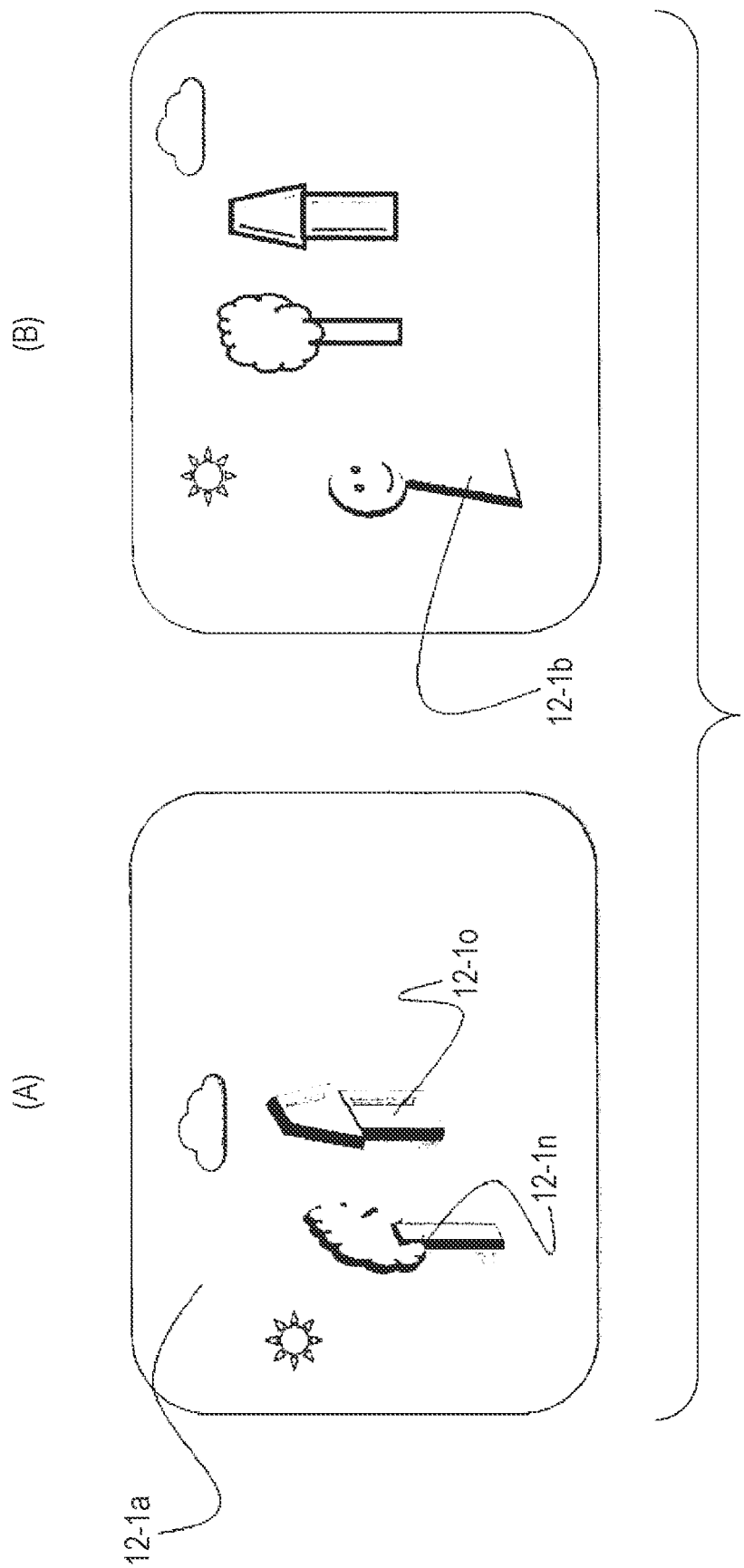
FIG. 10 is a schematic view of rendering seen from each viewpoint, in the virtual space illustrated in FIG. 9.

The distribution is permitted, and thus, the first distributor terminal 11 transmits motion data relevant to avatar display of the first distributor to the server 2 from each of the virtual items in the first virtual space illustrated in FIG. 9, as the live content, and starts to transmit a rendering image of the first virtual space seen from the avatar of the first distributor (FIG. 10(A), all items in the first virtual space seen from a first avatar 12-1b are rendered, and the same applies to the followings) and a rendering image seen from a first virtual camera having a field angle of θ1 (may be a fixed field angle or a zoomable field angle), disposed in the first virtual space (FIG. 10(B)) to the server 2 (step S104). The virtual camera is not necessarily disposed in the center as illustrated, but the installation location thereof may be arbitrary, the virtual camera may be moved, or a plurality of virtual cameras may be installed. In addition, the virtual camera may be added in the middle of the live content. In addition, the virtual camera can also be installed or moved by the viewer of the live content, the other distributor performing the common distribution, and a viewer of the other content to be commonly distributed. The operation of the virtual cameras is common to other parts of the present specification, and in order to avoid complication in the following description, only one virtual camera is exemplified in each virtual space.

According to the list, a viewer who knows the existence of the live content during the broadcasting applies the viewing of the live content to the server 2 from the first viewer terminal 12 (step S105), and as a result thereof, the rendering image of the first virtual space seen from the avatar of the first distributor (FIG. 10(A)) and the rendering image seen from the first virtual camera (FIG. 10(B)) are continuously transmitted as a moving image to the first viewer terminal 12 from the server 2, and the viewer selects and displays a desired image by a manipulation, and thus, is capable of viewing the image. Note that, the motion data of the avatar 12-1*b* of the first distributor may be transmitted to the first viewer terminal 12 from the server 2, in addition to the data of the rendered image as described above, and the rendering may be performed by the first viewer terminal 12. Such a modification is also capable of applying to the other parts of the present specification.

In addition, the live content that is distributed by the first distributor terminal 11 is not limited to the first viewer terminal 12, but other users using this video distribution system are also capable of performing an application to view the live content.

Figure 11:
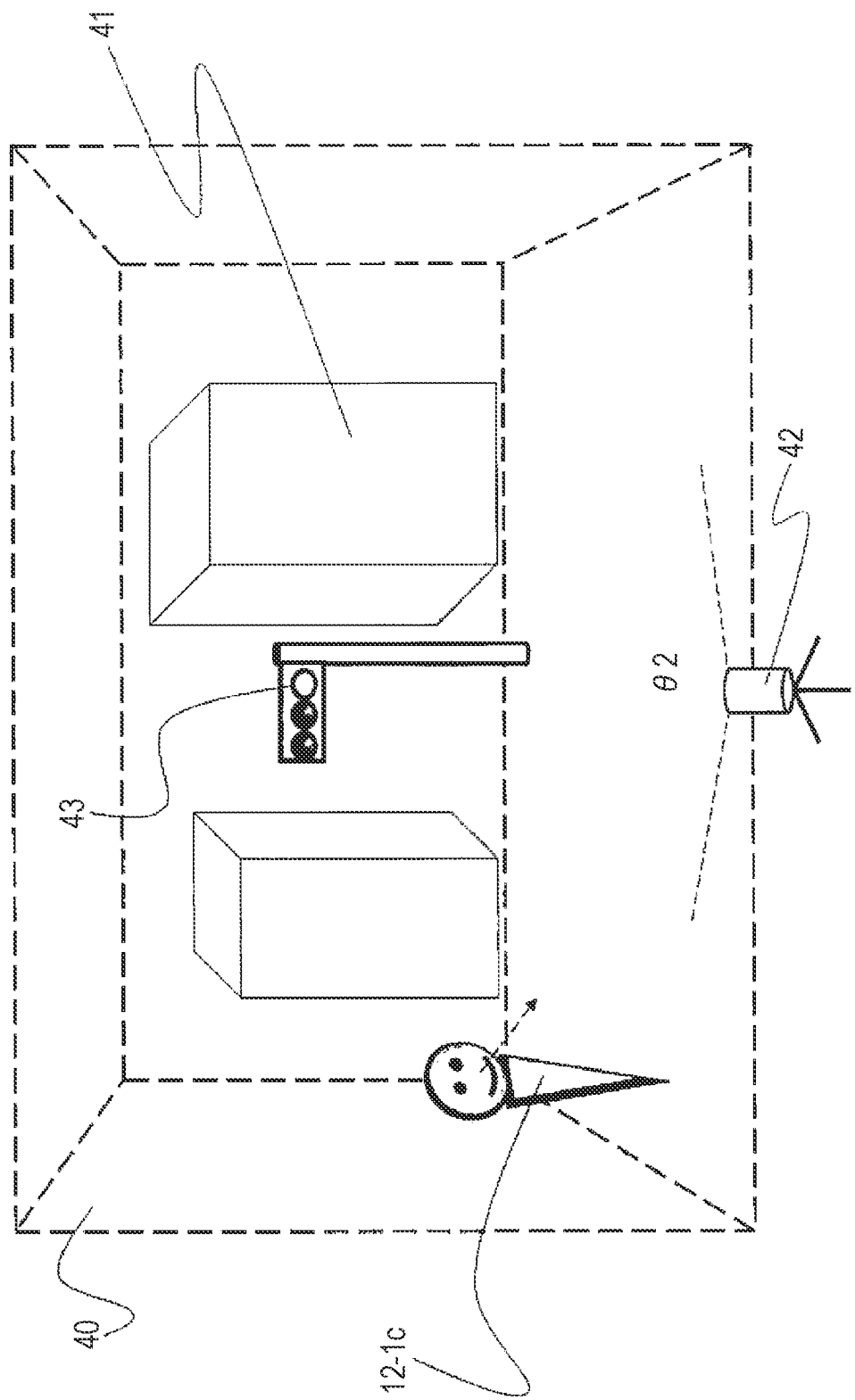
FIG. 11 is a schematic view of a second virtual space before the common distribution, in the content distribution receiving system of the present invention.
Figure 12:
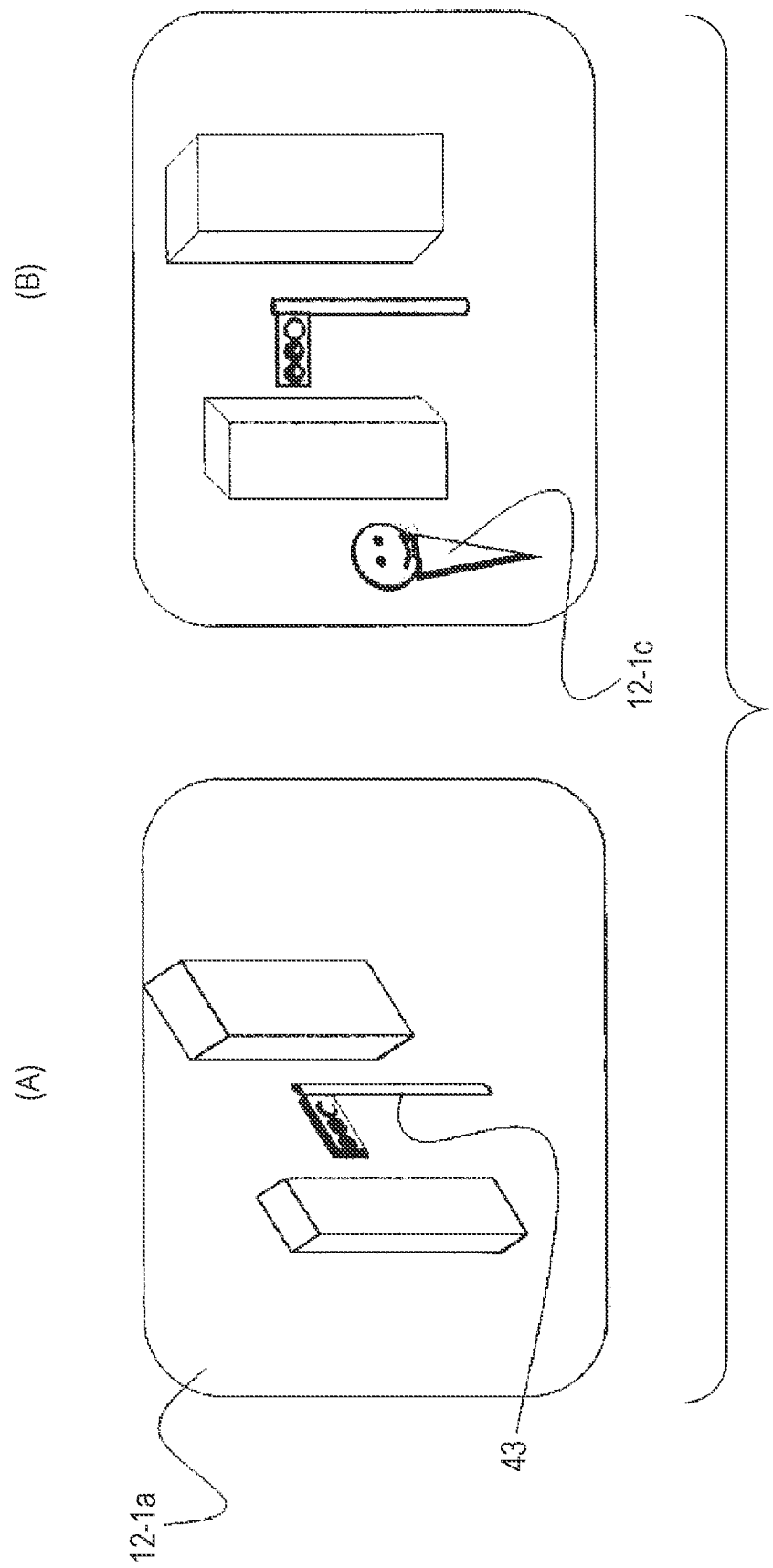
FIG. 12 is a schematic view of rendering seen from each viewpoint, in the virtual space illustrated in FIG. 11.

The operation of the start of the distribution and the viewing of the live content, described above, is completely the same in the second distributor terminal 21 and the second viewer terminal 22 belonging to the second distribution group 20, FIG. 11 illustrates that a background 41, a traffic light 43 that is the virtual item, a second virtual camera 42 having a field angle of θ2, and an avatar display 12-*c* of a second distributor are included in a second virtual space 40 that is used in the distribution of the live content by the second distributor terminal 21, FIG. 12(A) illustrates a rendering image seen from the viewpoint of the avatar display 12-1*c* of the second distributor, and FIG. 12(B) illustrates a rendering image seen from the viewpoint of the second virtual camera 42.

[Commitment of Virtual Item in Virtual Space]

Figure 13:
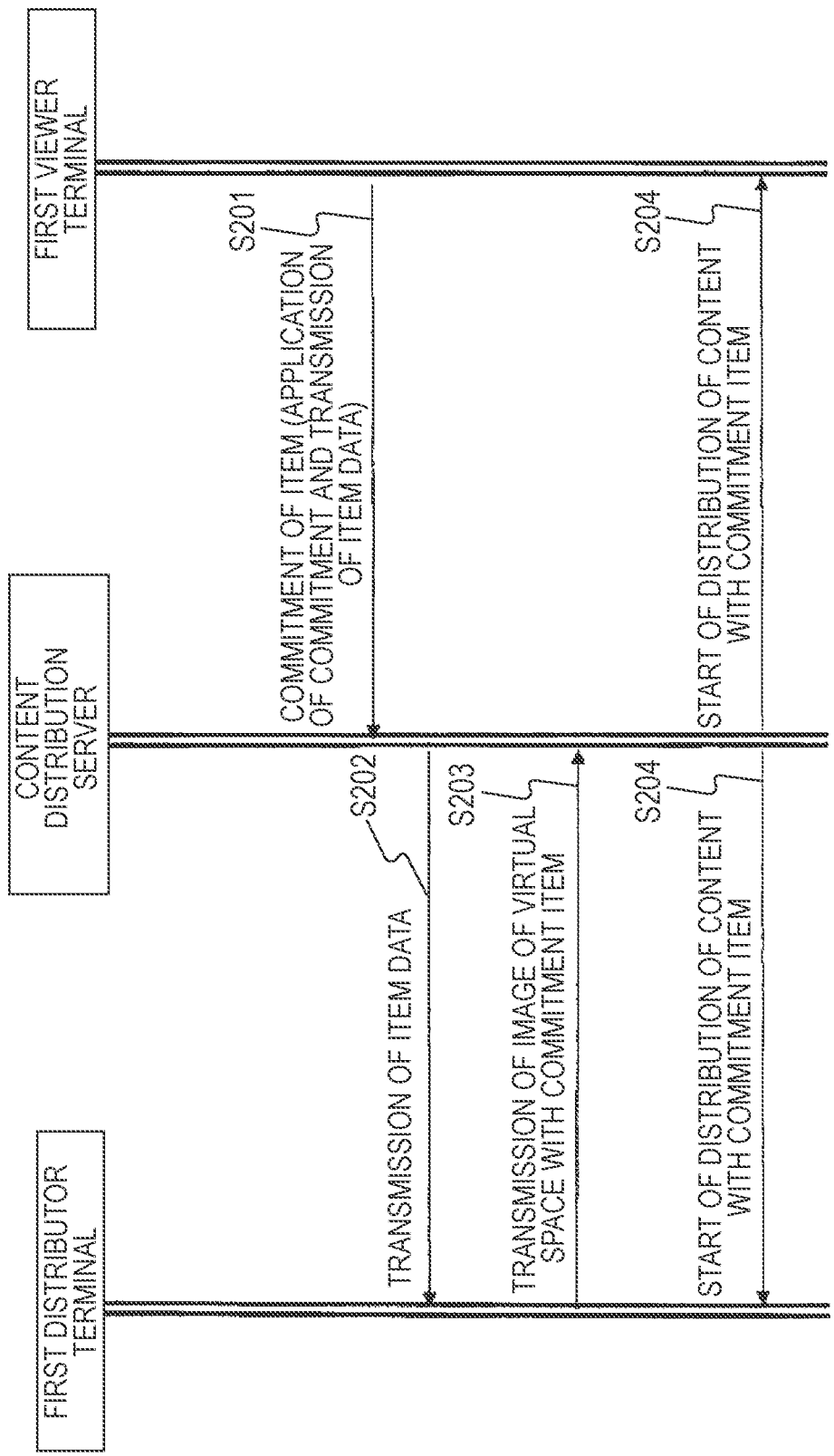
FIG. 13 is a signal flowchart of commitment of a virtual item before the common distribution, which is executed by the content distribution receiving system of the present invention.
Figure 14:
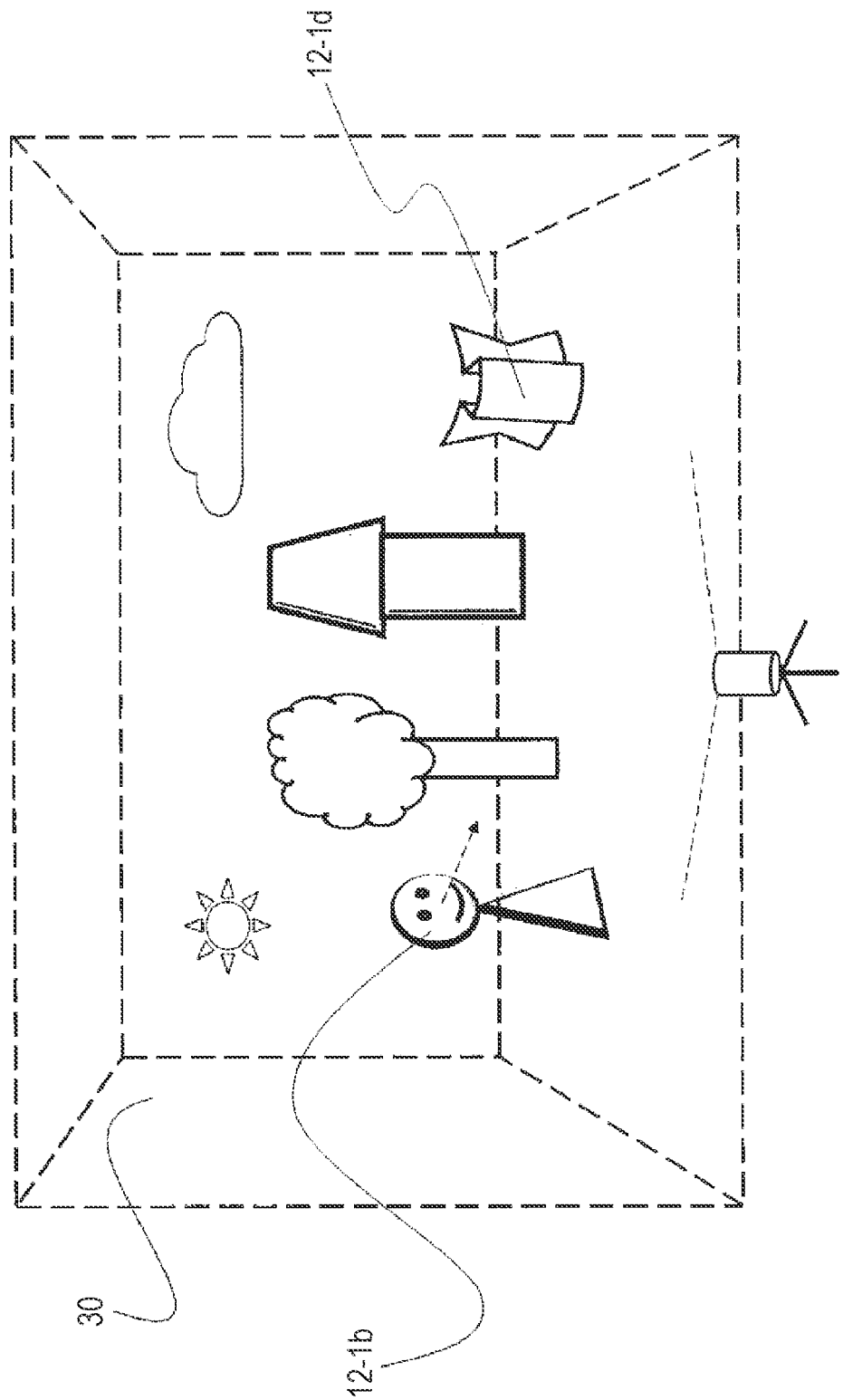
FIG. 14 is a schematic view of the first virtual space before the common distribution, in which the commitment of the virtual item is performed, in the content distribution receiving system of the present invention.
Figure 15:
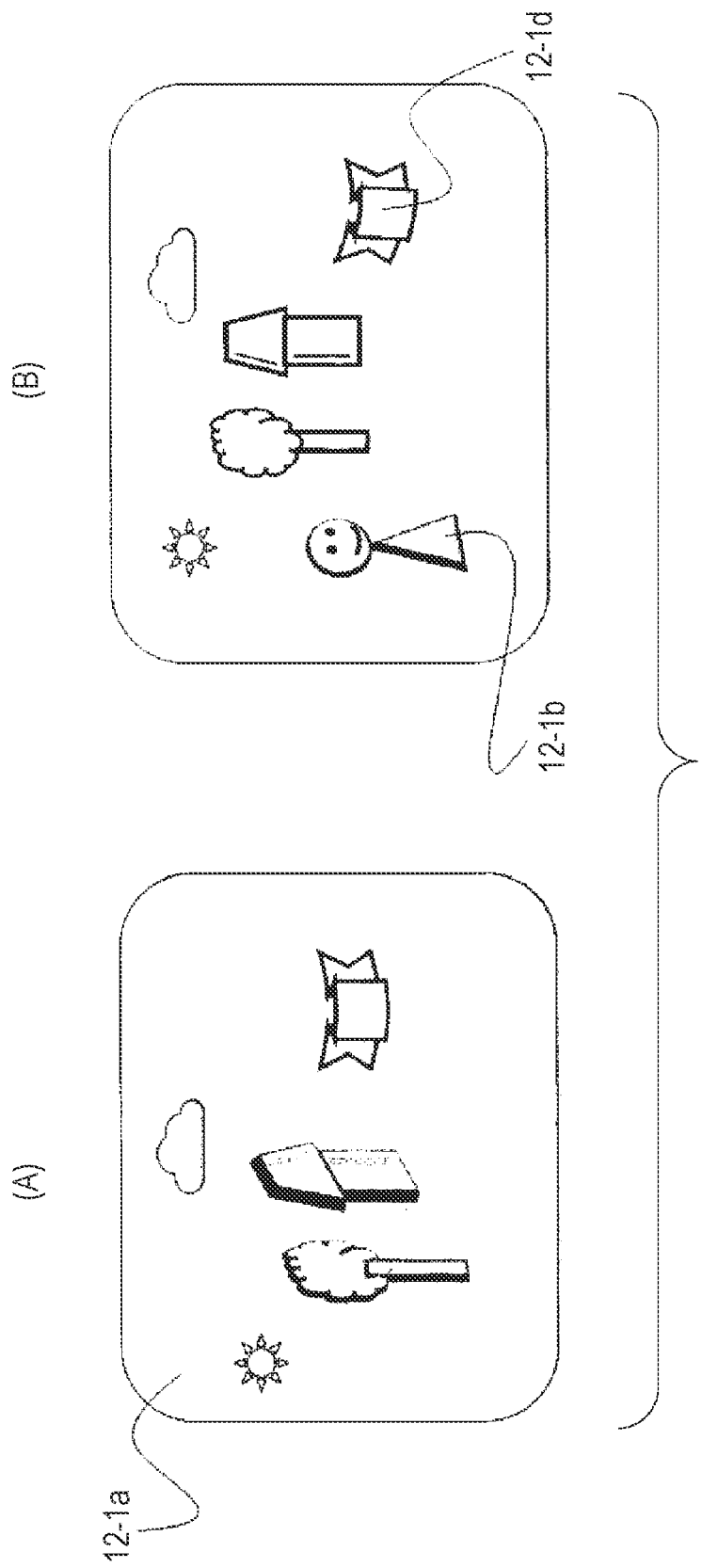
FIG. 15 is a schematic view of rendering seen from each viewpoint, in the virtual space illustrated in FIG. 14.

Next, a commitment operation of the first virtual item 12-1*d* representing the ribbon-type appearance in order for indicating the support, the praise, or the like with respect to the live content from the first viewer terminal 12 viewing the live content that is being distributed by the first distributor terminal 11 will be described with reference to FIG. 13, FIG. 14, and FIG. 15.

First, a viewer who plans to perform the commitment of the virtual item 12-1*d* performs the application of the commitment and the transmission of item data with respect to the server 2 from the first viewer terminal 12, as an item commitment operation (step S201). The item data, for example, includes ribbon-type appearance data or the like, such as the first virtual item 12-1*d* illustrated in FIG. 14.

The server 2 stores the received item data by the same method as that of the motion data of the first distributor avatar 12-1*b*, that is, by using the same configuration that is the same storage means or the same transmitting means, and transmits the item data to the first distributor terminal 11 (step S202). As a result thereof, in the first distributor terminal 11, in addition to the data of the first distributor avatar 12-1*b*, the virtual space 30 is rendered by using the data of the virtual item 12-1*d* subjected to the commitment so far, and then, in the live content that is distributed by the first distributor terminal 11, an image of the first virtual item 12-*d* is added to the live content, as with a rendering image seen from the viewpoint of the first distributor avatar 12-1*b*, illustrated in FIG. 15(A), and a rendering image seen from the viewpoint of the second virtual camera, illustrated in FIG. 15(B) (step S203), and the image can be visually recognized by all viewers viewing the live content (including the first distributor), and thus, all of the viewers understand the feeling of support or praise that the viewer wanted to represent (step S204).

[Execution of Common Distribution]

Figure 8:
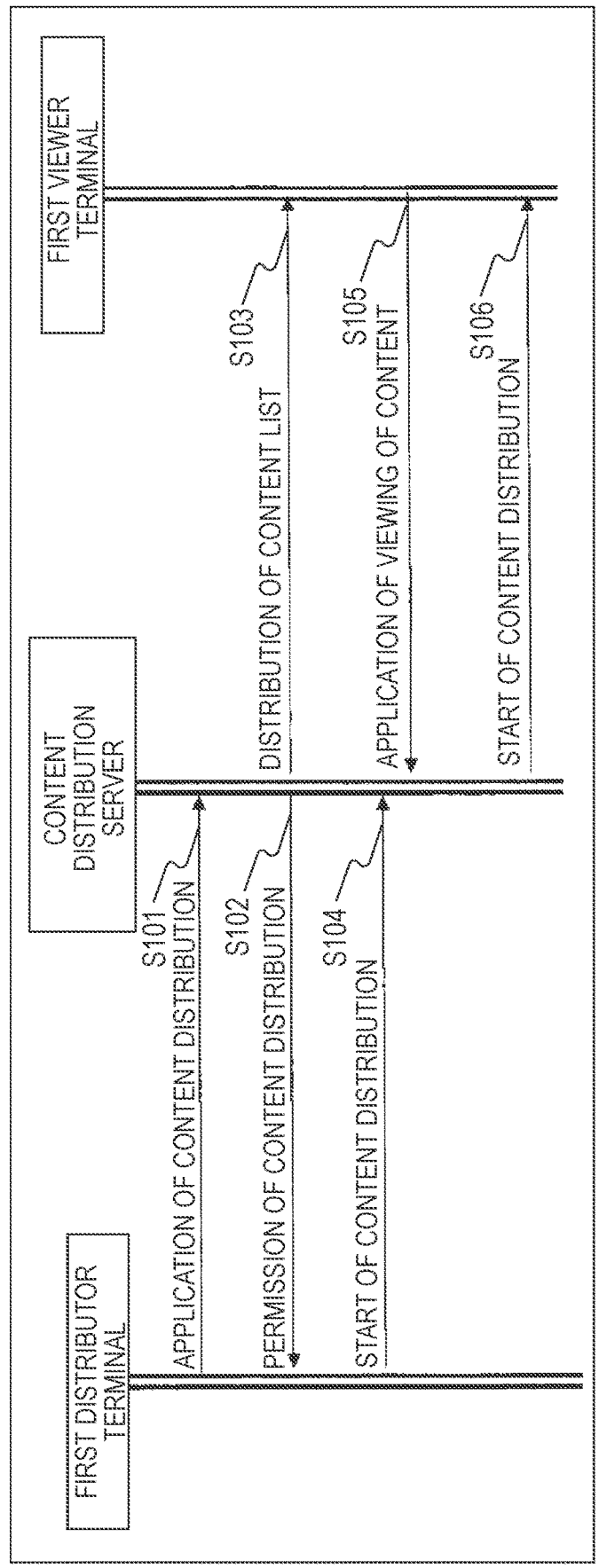
FIG. 8 is a signal flowchart of content viewing before common distribution, which is executed by the content distribution receiving system of the present invention.
Figure 16:
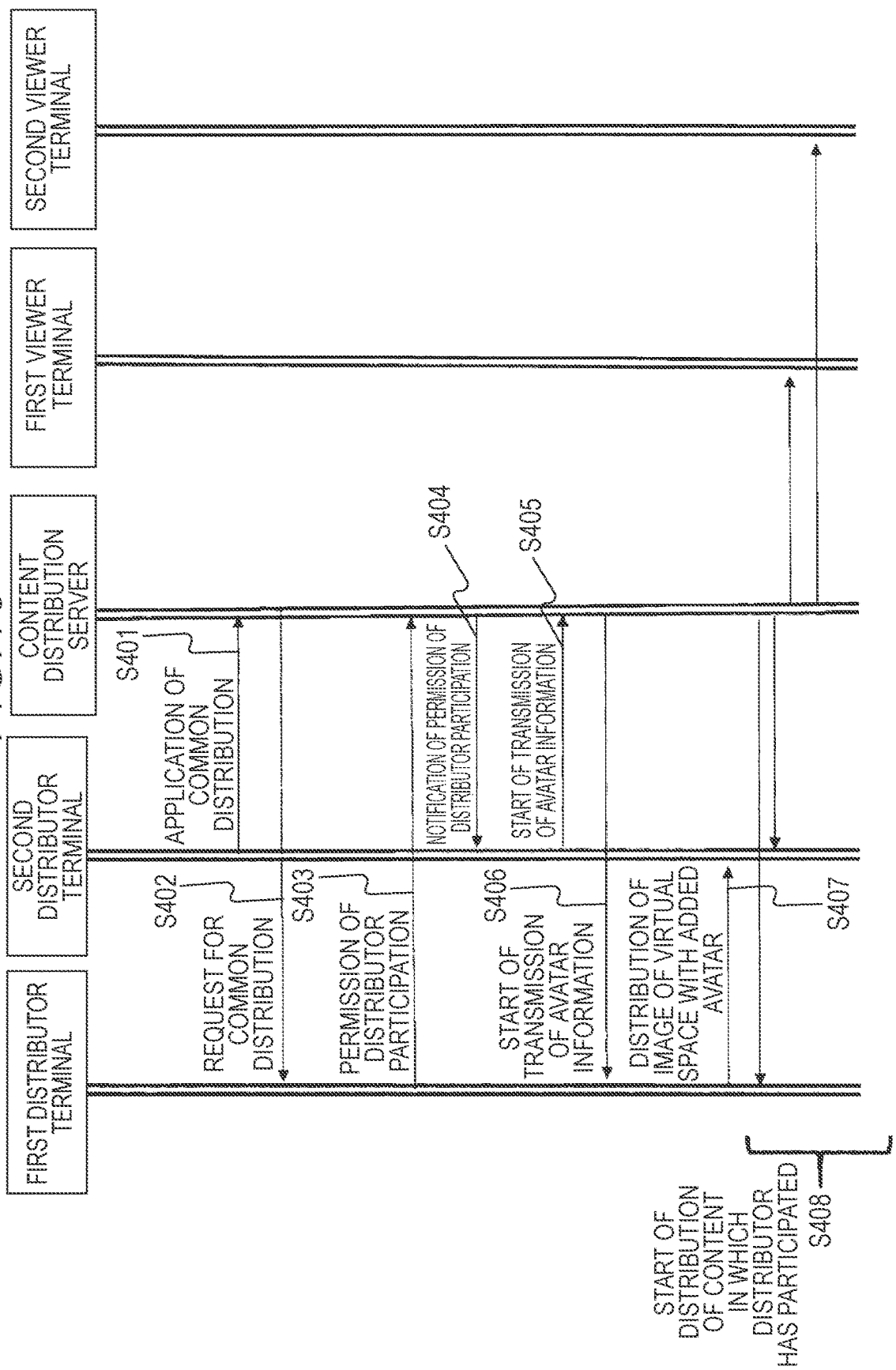
FIG. 16 is a signal flowchart of execution of the common distribution, which is executed by the content distribution receiving system of the present invention.
Figure 17:
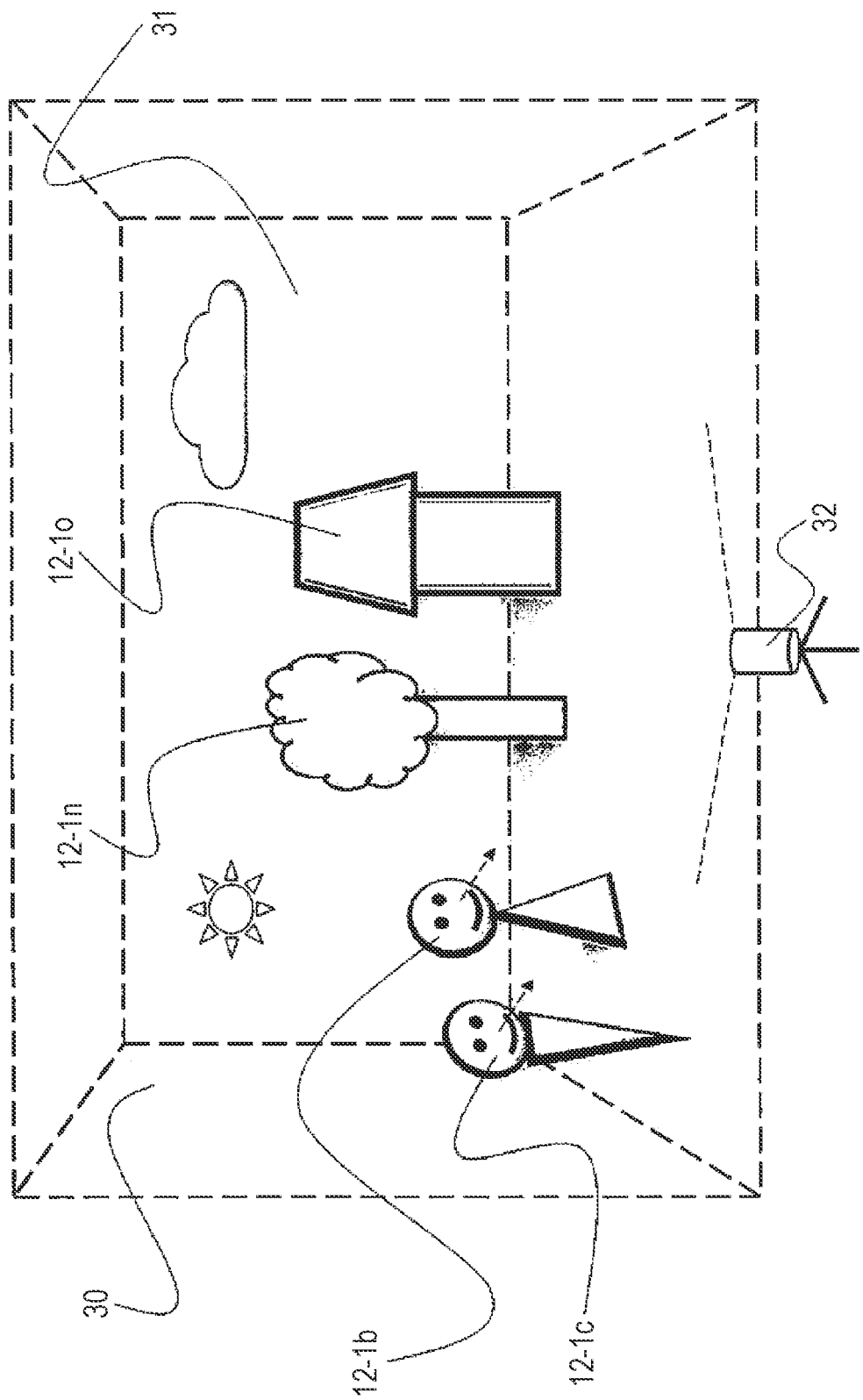
FIG. 17 is a schematic view of the first virtual space after the common distribution is started, in the content distribution receiving system of the present invention.
Figure 18:
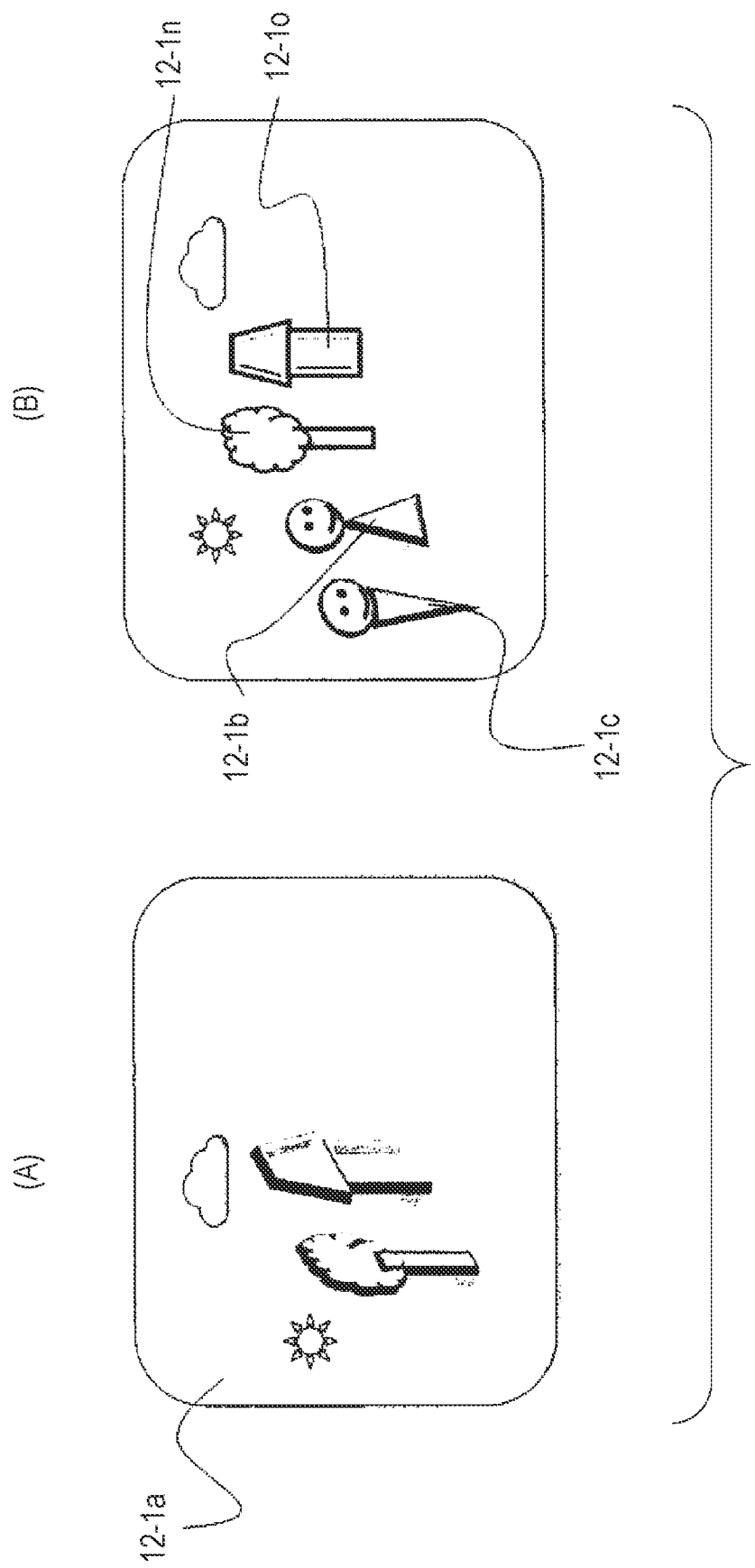
FIG. 18 is a schematic view of rendering seen from each viewpoint, in the virtual space illustrated in FIG. 17.
Figure 19:
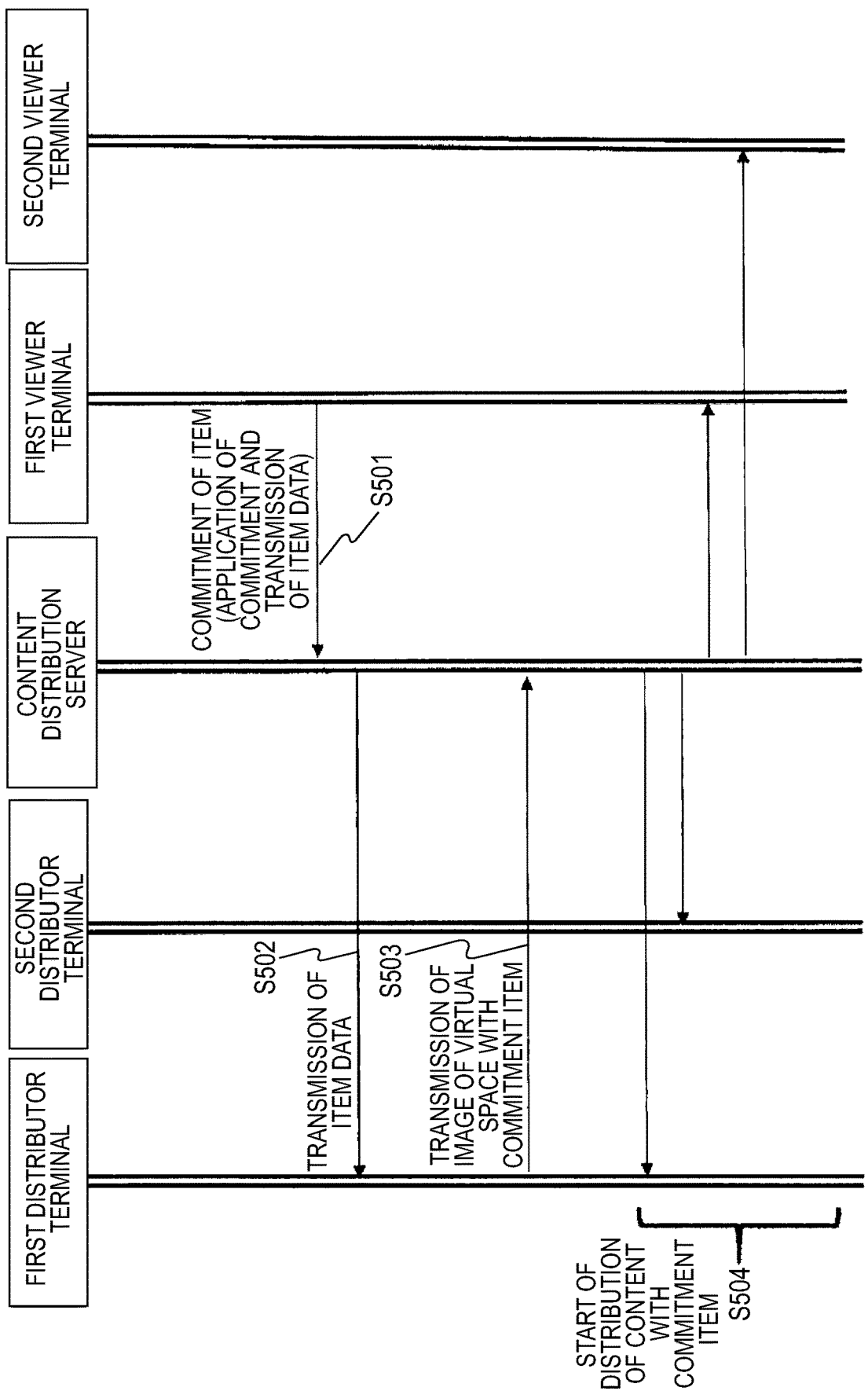
FIG. 19 is a signal flowchart in a case where the commitment of the virtual item after the common distribution is started, which is executed by the content distribution receiving system of the present invention, is performed from the first viewer terminal.
Figure 20:
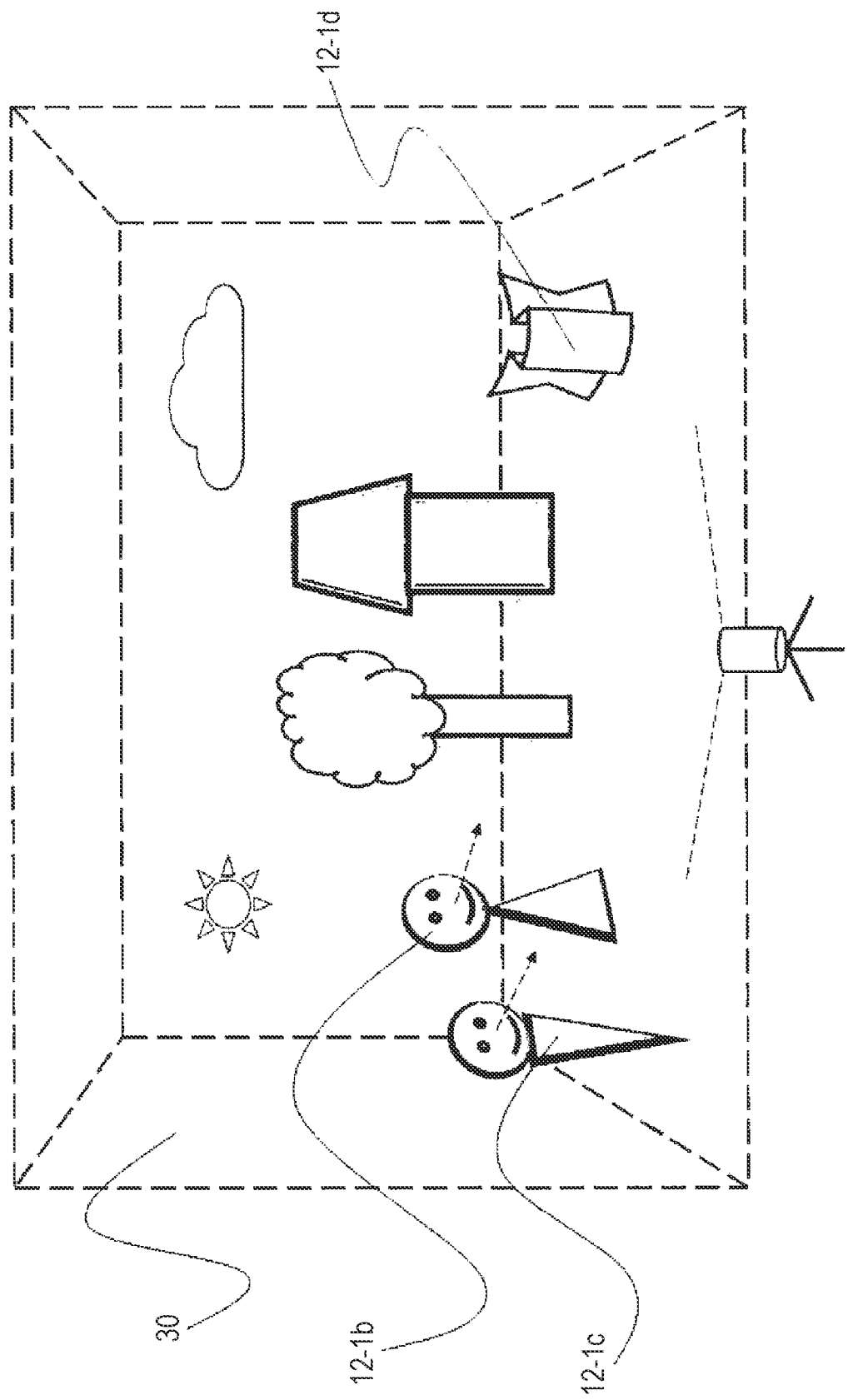
FIG. 20 is a schematic view of the first virtual space after the common distribution is started, in which the commitment of the virtual item is performed, in the content distribution receiving system of the present invention.
Figure 21:
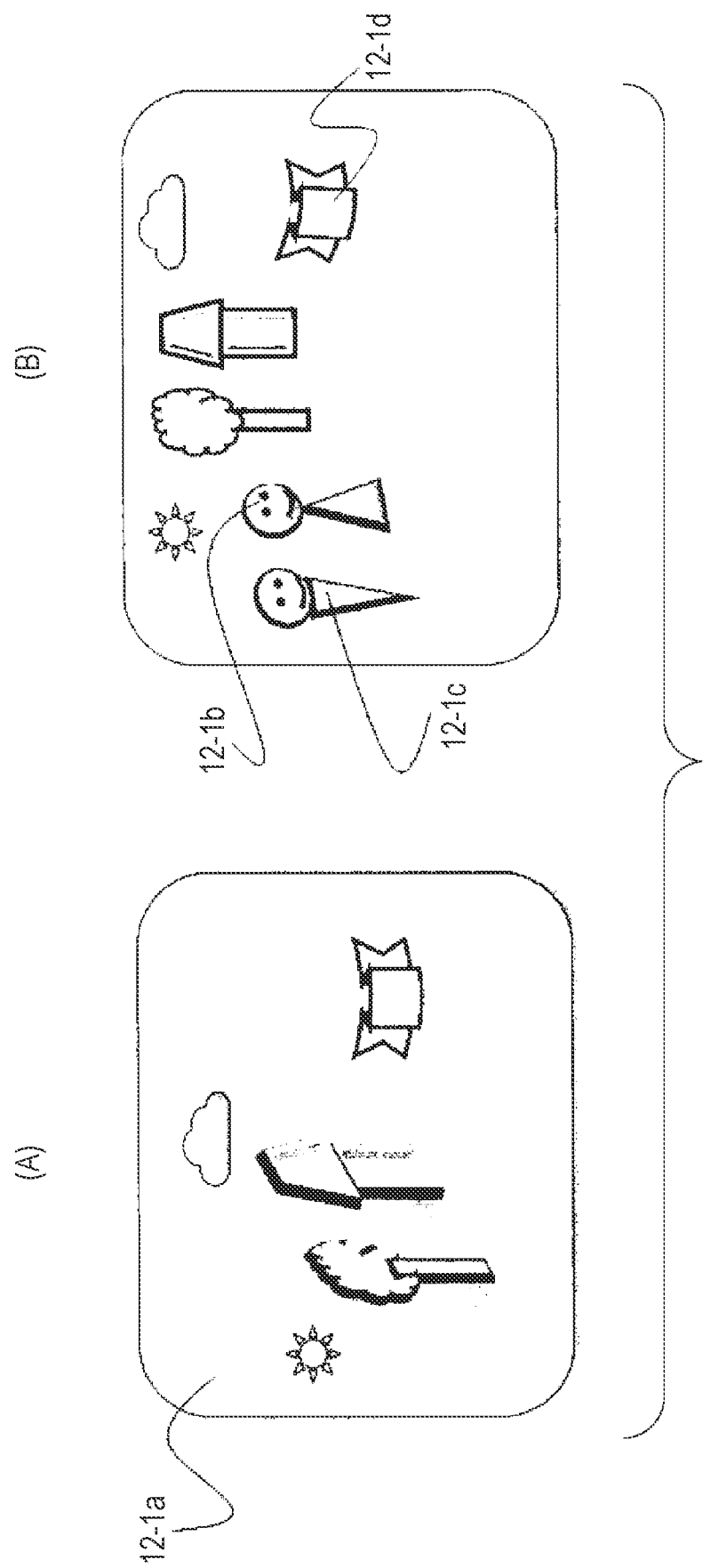
FIG. 21 is a schematic view of rendering seen from each viewpoint, in the virtual space illustrated in FIG. 20.

Next, each operation in which the second distributor terminal 21 performs the common distribution in a state where the first viewer terminal 12 is viewing the live content that is distributed by the first distributor terminal 11, described by using FIG. 8 to FIG. 10, will be described by using FIG. 16 to FIG. 18.

In this embodiment, as an example, the common distribution is permitted in advance by the first distributor terminal 11, and thus, the common distribution is applied to the server 2 from the second distributor terminal 21 (step S401).

The server 2 accepting the application transmits a common distribution request to the first distributor terminal 11 distributing the live content that is a target (step S402). In a case where the permission is obtained (step S403), the permission is notified to the second distributor terminal 21 from the server 2 (step S404), and the second distributor terminal 21 receives the permission, and transmits the avatar 12-*c* of the second distributor, and all data items in a case where there is the avatar of the viewer in the live content that is distributed from the second distributor terminal or there is the commitment virtual item, to the server 2 by using the same method as that of transmitting or storing the motion data or the appearance data of the avatar, described above, that is, the common storage means or the common transmitting means (step S405). The server 2 transmits the received data to the first distributor terminal 11 by the same method as that of the motion data of the avatar, that is, the common storage means or the common transmitting means (step S406). It is sufficient that the first distributor terminal 11 receiving the data renders the first virtual space 30 as with the motion data of the avatar, and as a result thereof, the first virtual space 30 is changed as with a conceptual diagram of the first virtual space of FIG. 16. The first distributor terminal 11 transmits a rendering image seen from the viewpoint of the first distributor avatar 12-1*b* and the second distributor avatar 12-1*c*, illustrated in FIG. 18(A), and a rendering image seen from the viewpoint of first virtual camera 32, illustrated in FIG. 18(B), to the server 2 (step S407), and then, the server 2 distributes each of the rendering images illustrated in FIG. 18 to all of the viewers viewing the live content that has been distributed from the first distributor terminal 11 so far and all of the viewers viewing the live content that has been distributed from the second distributor terminal 21 so far, as a live content (step S408).

Here, it is important that the start of the common distribution is based on the will of each distributor who has distributed each live content. The viewer of each live content visually recognizes a new avatar on the basis of the determination in a dimension different from the own will or participates in the viewing of a new live content, and thus, there is an element of surprise and amusingness on production, in the position of the viewer, and there is a merit of increasing a target to be supported or praised. In addition, there is a merit of increasing the number of viewers and the range of viewers of the live content that is staged by the distributor, in the position of each of the distributors.

[Execution of Virtual Item Commitment after Common Distribution]

Next, as described above by using FIG. 16 to FIG. 18, a commitment operation of the virtual item in which the avatar or the like of the live content that is distributed by the second distributor terminal 21 participates in the live content that is distributed by the first distributor terminal 11, during the common distribution, will be described by using FIG. 19 to FIG. 24.

In a case where the commitment is performed in the live content during the common distribution from the first viewer terminal 12, item commitment (the application of the commitment and the transmission of the item data) is performed with respect to the server 2 from the first viewer terminal 12, by the method described above (step S501), and the transmission of the item data is performed with respect to the first distributor terminal 11 from the server 2 (step S502), and thus, the first distributor terminal 11 subsequently renders the first virtual space 30 by including the virtual item 12-1$d$ representing a ribbon shape, and then, an image rendered from the viewpoint of the first distributor avatar 12-1$c$ and the viewpoint of the second distributor avatar 12-1$c$ (FIG. 21(A)) and an image rendered from the viewpoint of the first virtual camera 32 (FIG. 21(B)) are distributed to all of the viewer terminals and the distributor terminals subjected to the common distribution (steps S503 and S504).

As a result thereof, the range of viewers of the live content increases, and thus, the viewer is capable of representing the support or the praise with respect to a surprising live content that the viewer did not have an opportunity to view with the intention or on the basis of information, the result of the support or the praise by the virtual item commitment is expanded even to a wider range of viewers and a larger number of viewers, and the commitment of the virtual items is extremely effective.

Figure 22:
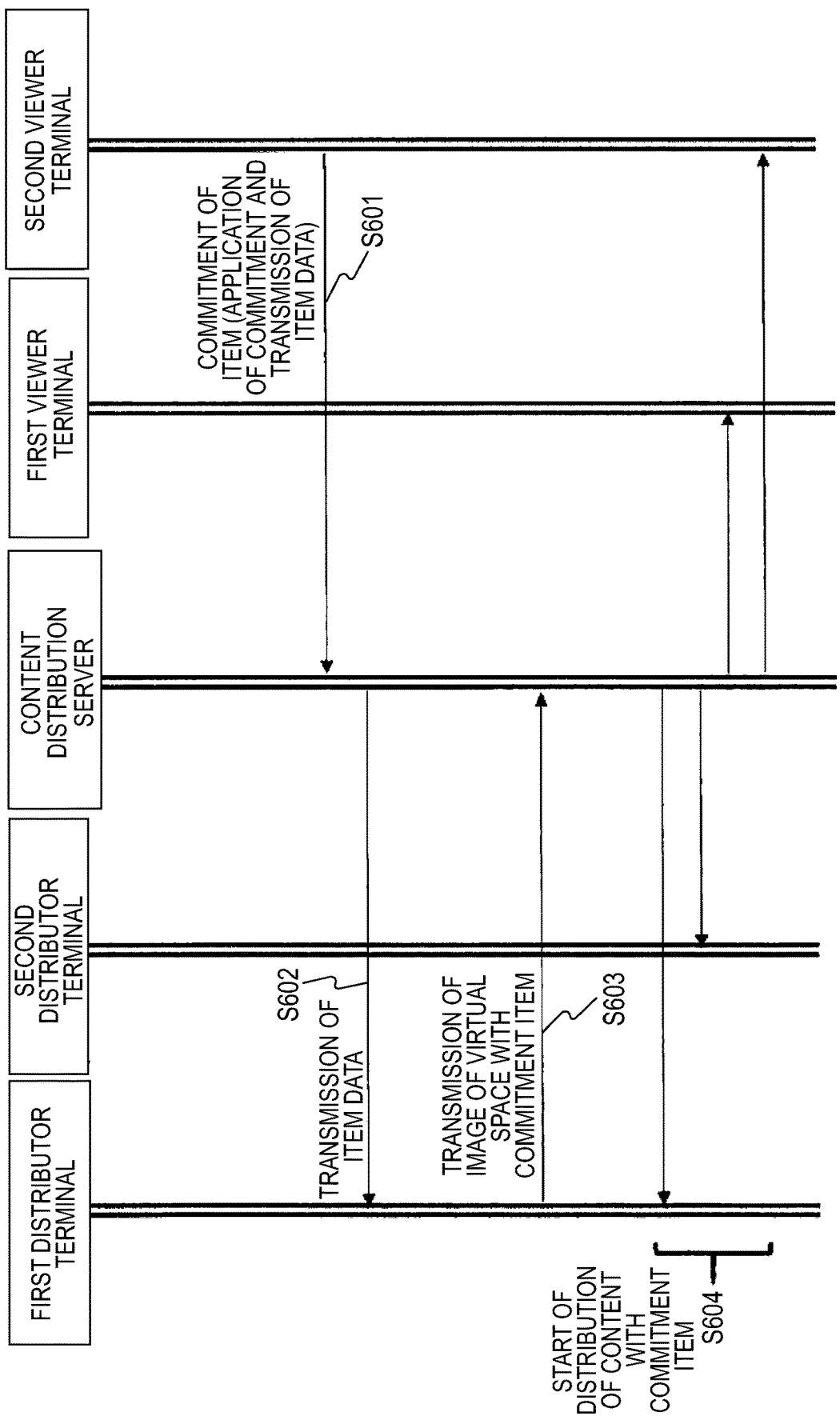
FIG. 22 is a signal flowchart in a case where the commitment of the virtual item after the common distribution is started, which is executed by the content distribution receiving system of the present invention, is performed from the second viewer terminal.
Figure 23:
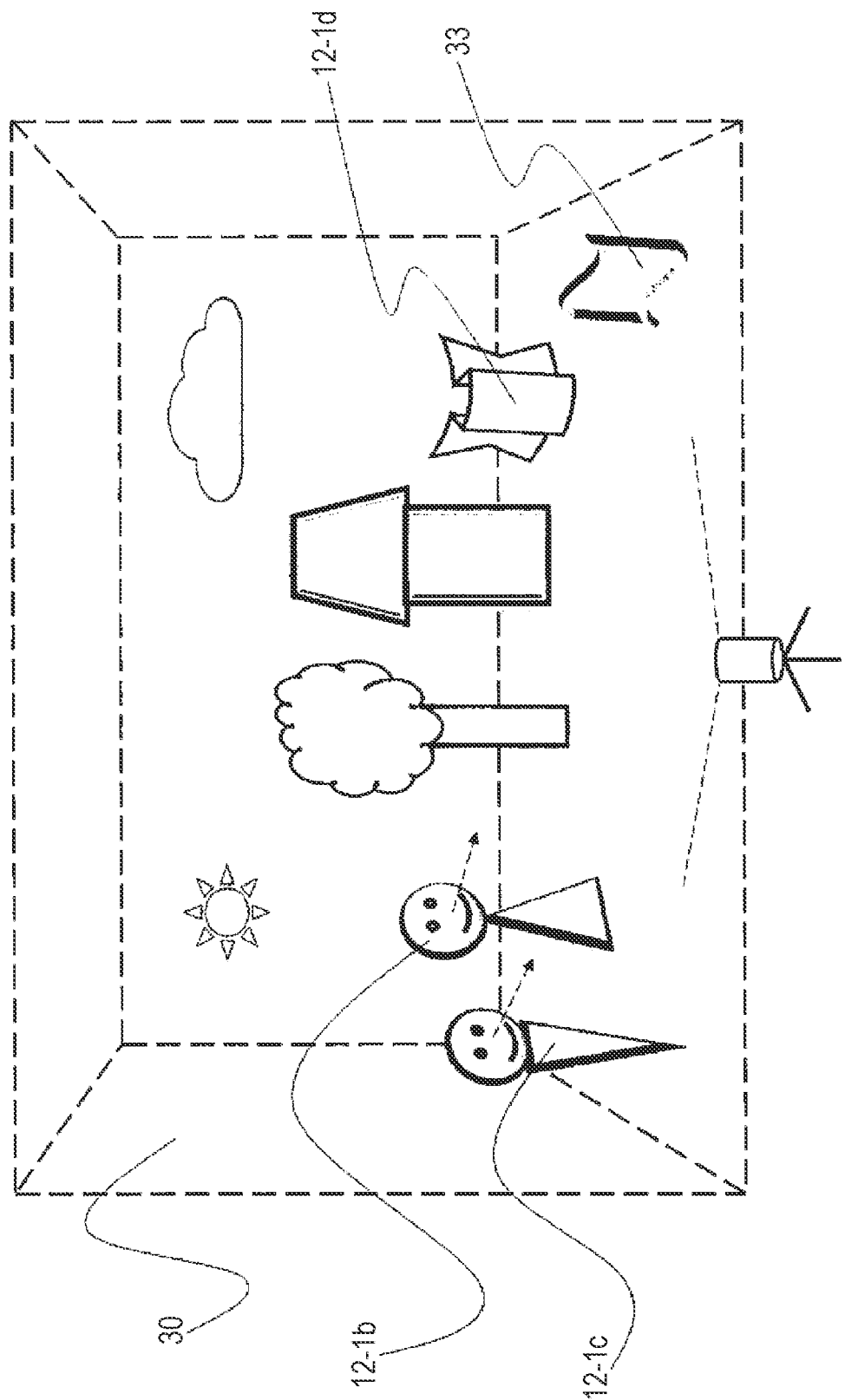
FIG. 23 is a schematic view of the first virtual space after the common distribution is started, in which the commitment of the virtual item is performed, in the content distribution receiving system of the present invention.
Figure 24:
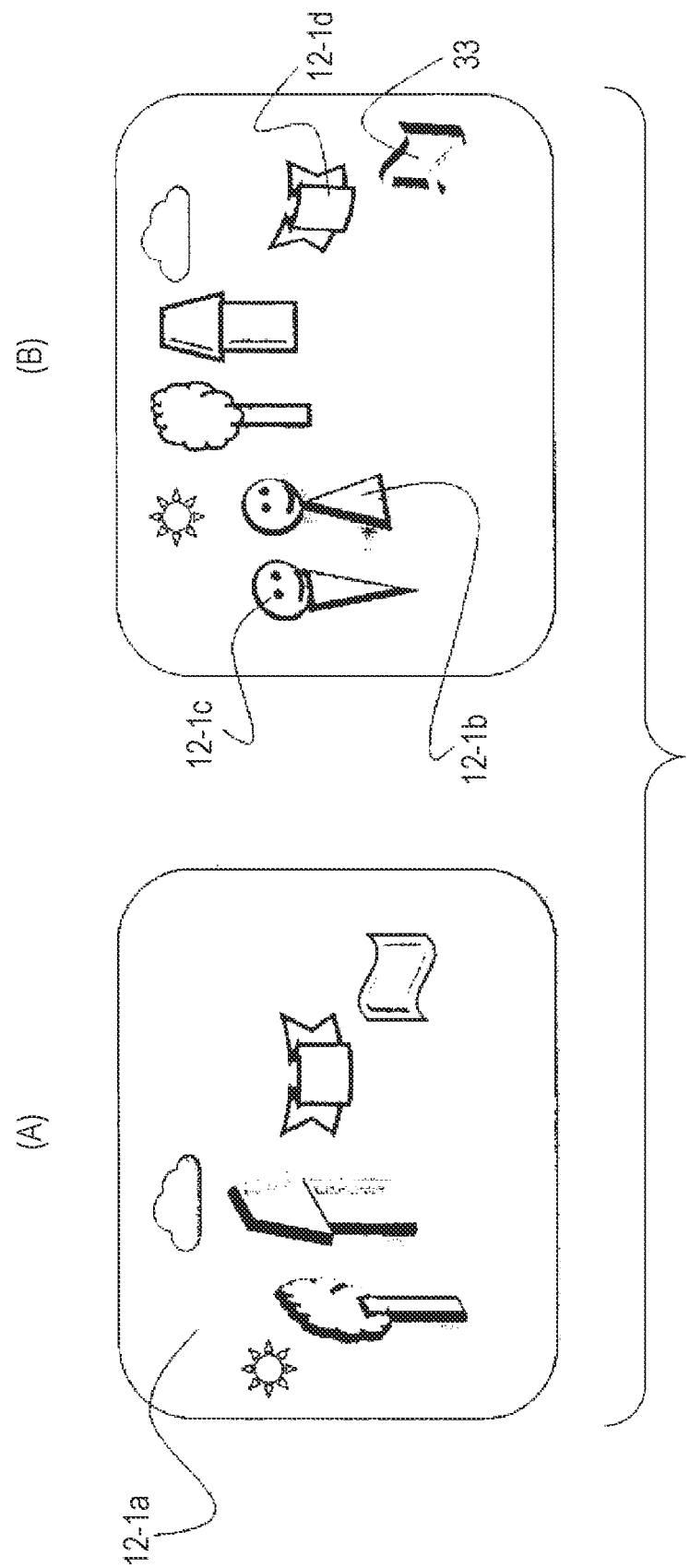
FIG. 24 is a schematic view of rendering seen from each viewpoint, in the virtual space illustrated in FIG. 23.

Note that, a commitment operation of the virtual item from the second viewer terminal 22 is illustrated in FIG. 22 to FIG. 24, and a second virtual item 33 indicating a commemorative shield, used in the commitment, has a shape different from that of the first virtual item 12-1$d$, and thus, for example, it is also possible for the other viewer to understand from which viewer the item has been thrown and to enjoy the creativity of the shape of the virtual item itself.

Modification Example 1~Arbitrary Properties of Disposition of Each Configuration In the above description of this embodiment, the rendering of each viewpoint image with respect to the virtual space staged by the distributor is performed by a distributor terminal of an organizer. However, such a configuration is not essential for the implementation of the present invention. That is, the rendering may be performed by the server, or may be performed by the other distributor terminal performing the common distribution and each of the viewer terminals viewing the live content. In order to perform the rendering as described above, it is sufficient that the background of the virtual space, the data of the disposed virtual item, the data of each of the avatars, and the data of the commitment virtual item are transmitted in advance to the server or the terminal to be rendered, and the detailed configuration or procedure is obvious from the configuration of this embodiment described above.

Modification Example 2~Diversity of Aspect of Common Distribution

Similarly, in the above description of this embodiment, in the common distribution, each of the avatars or the commitment virtual item is shared between the virtual space 30 and the virtual space 40 while the background or the existence of the virtual item is maintained by utilizing the virtual space 30 on an application side of the common distribution. However, such a configuration is not also essential, and for example, the background or the virtual item on the virtual space 40 side may be utilized, or the rendering may be performed such that the background of the virtual space or the virtual item that the viewer has been viewing before the common distribution is utilized. As described above, in order to perform the rendering, the background of the virtual space or the data of the disposed virtual item, the data of each of the avatars, and the data of the commitment virtual item may be transmitted in advance to the server or the terminal that plans to perform the rendering, and similarly the detailed configuration or procedure is obvious from the configuration of this embodiment described above.

Modification Example 3~Utilization of Virtual Item for Commitment to which Motion Information is Added As described above, the virtual item subjected to the commitment in the virtual space is configured in the system 1 of the present example to be transmitted or stored by the same procedure and configuration as that of the motion data (the motion information) of the avatar (a substitution) of the distributor or the viewer.

Accordingly, as with the avatar, motion information (position information, direction information and speed information of movement, posture information, sound information, oscillation information, and the like) can be included in the virtual item used in the commitment.

By setting the virtual item to a virtual item for commitment to which such motion information is added, various productions for increasing the interest or the attention of the user can be performed.

Figure 25:
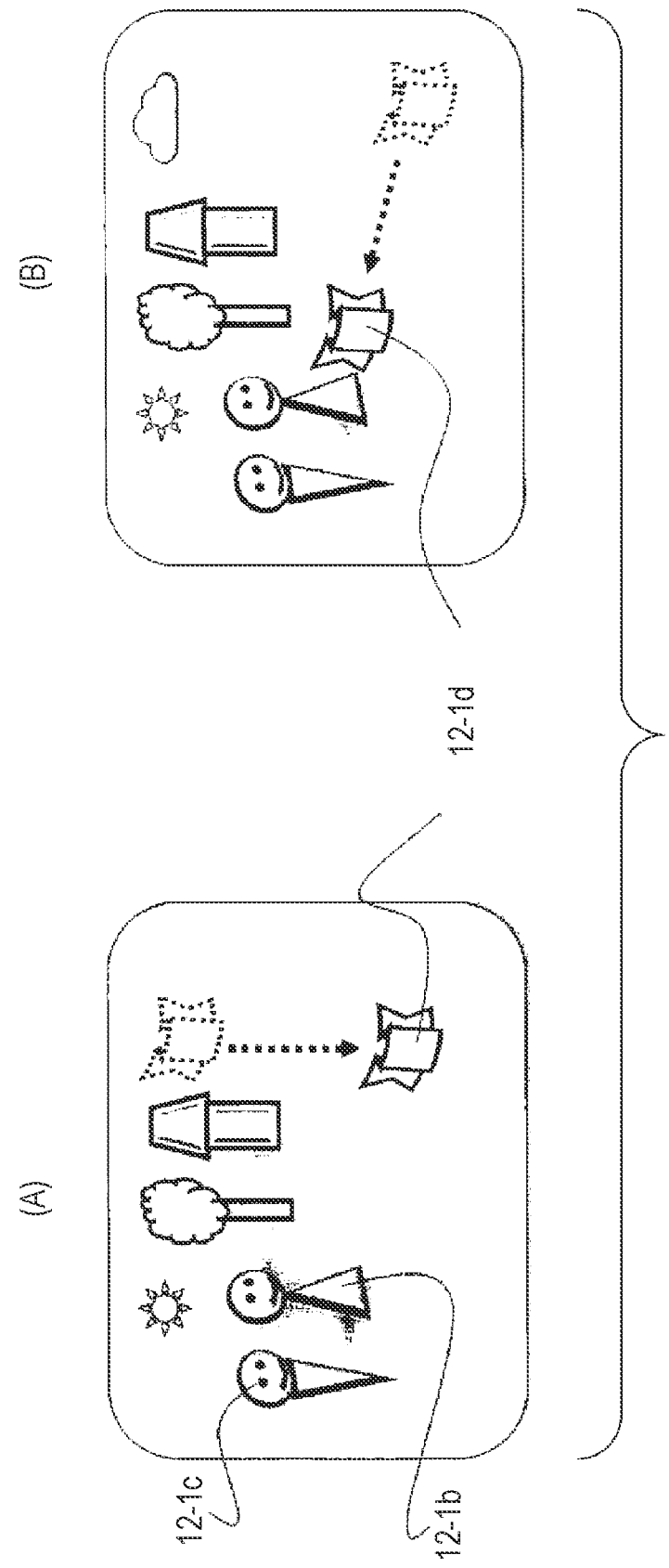
FIG. 25 is a schematic view illustrating an application example in a case where motion information is added to the virtual item for commitment, in the content distribution receiving system of the present invention.

For example, a schematic view illustrated in FIG. 25(A) indicates a production in which the virtual item 12-1$d$ subjected to the commitment in the virtual space 30 falls from the top to the bottom and lands on the ground of the virtual space. The commitment of the item, for example, is common to a sense of throwing "Ohineri (wrapped offering)" onto the stage of the theater or throwing bouquet in a wedding, and such a production is a production of a natural sense and is easy to get the compathy of the viewer.

Similarly, a schematic view illustrated in FIG. 25(B), is a production in which when a commitment target of the item, for example, is set to the first distributor 12-1$b$, and performs a predetermined manipulation as described above, the virtual item 12-1$d$ subjected to the commitment in the virtual space is moved in the virtual space toward the first distributor 12-1$b$ that is a target of the commitment. From the example of "Ohineri (wrapped offering)" described above, such a production can be a natural production.

Figure 26:
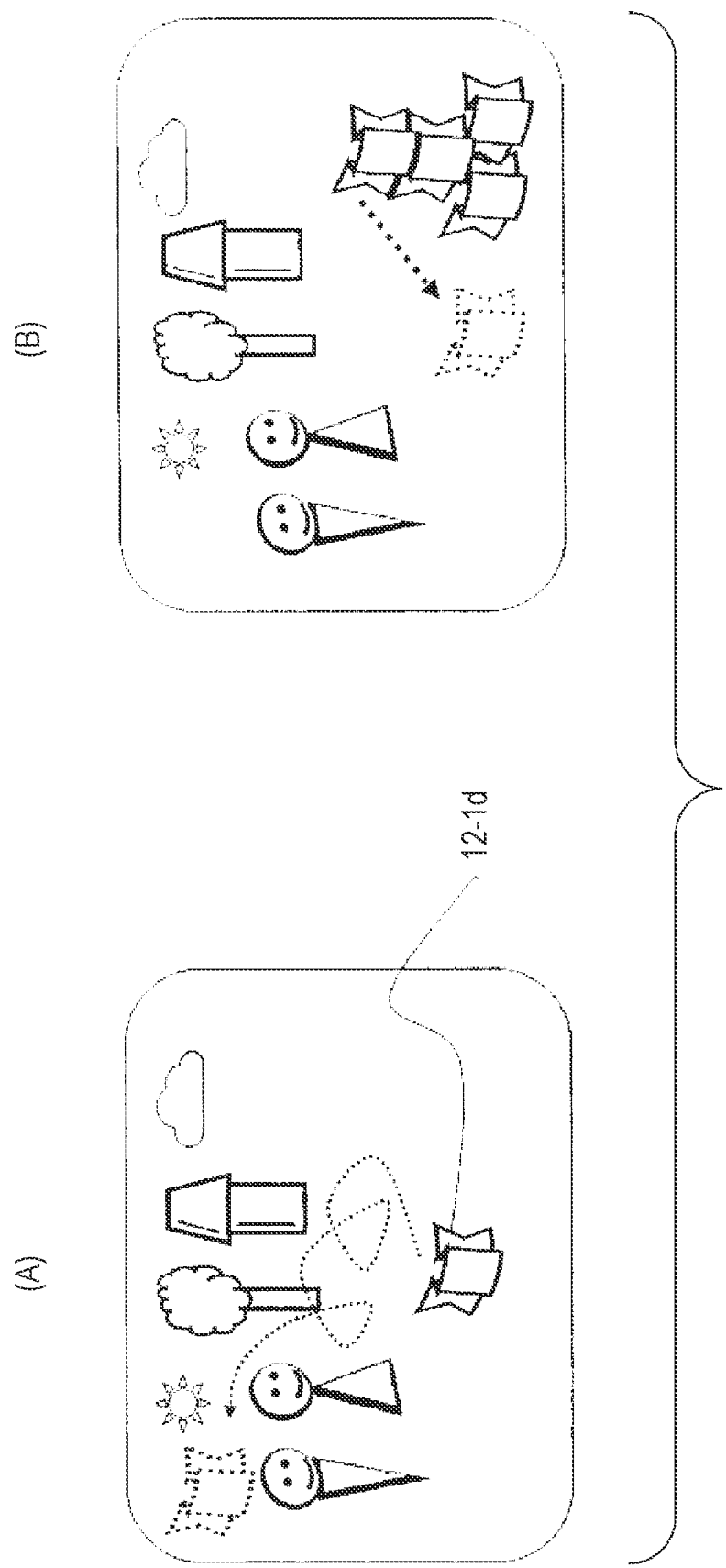
FIG. 26 is a schematic view illustrating an application example in a case where the motion information is added to the virtual item for commitment, in the content distribution receiving system of the present invention.

Similarly, FIG. 26(A) is a production in which the virtual item 12-1$d$ subjected to the commitment in the virtual space is automatically moved around the virtual space (including flying) or is moved around the virtual space, in accordance with a manipulation of a person performing the commitment. Such a production is a considerably noticeable production, compared to a case where the virtual item after the commitment is still in the virtual space, and thus, is useful for the appeal of the commitment.

A schematic view illustrated in FIG. 26(B) is a production in which when the number of virtual items 12-1$d$ subjected to the commitment from a plurality of viewers increases or the same person continuously performs the commitment of a plurality of items, the thrown items are once stacked, and then, collapse. It is expected that the commitment of the virtual item is concentrated on a popular live content, a popular scene, and a popular performer, and such a production is likely to be attained and has a great effect on the production.

Modification Example 4~Measure on Production in Commitment of Virtual Item

In desired measures on the production in the case of the commitment of the virtual item, including the respects described above, it is a good method to decide a target such as a specific performer and perform the commitment on the manipulation, in addition to setting the target of the commitment to the overall live content. The virtual item subjected to the commitment by specifying the target may be disposed near the target person or may be written with the name of the target person.

In addition, it is also desirable to dispose the item subjected to the commitment within a viewing field of the virtual camera.

Hereinafter, a more preferred embodiment of the commitment item will be described.

[More Preferred Embodiment of Commitment Item]

Figure 27:
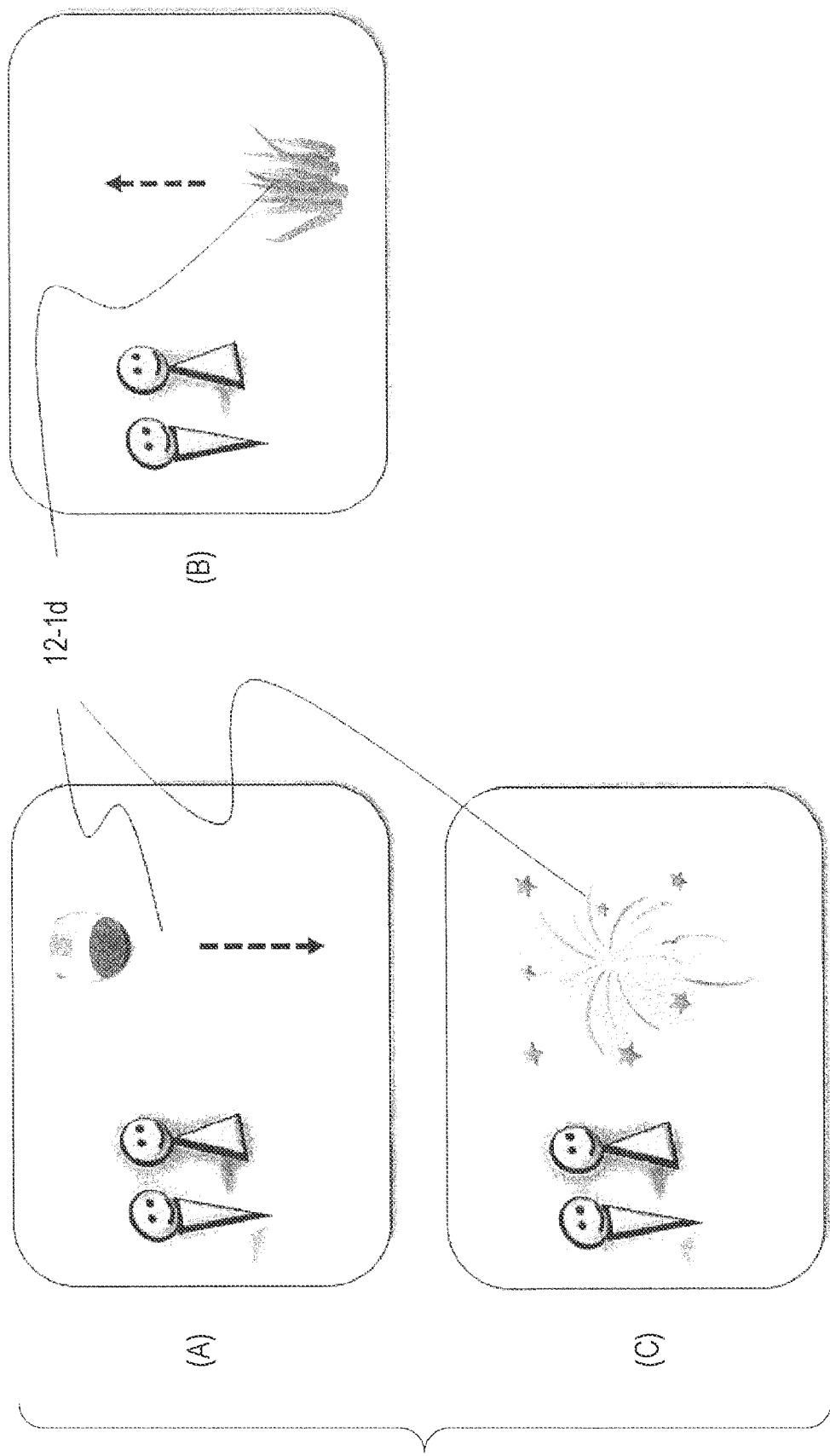
FIG. 27 is a schematic view illustrating another aspect of the virtual item for commitment, in the content distribution receiving system of the present invention.

An example of the virtual item 12-1*d* subjected to the commitment in this embodiment is a symbol representing the support or the praise of the viewer or the distributor, and for example, can be a production such as a wine glass object that falls from the top to the bottom of the virtual space (FIG. 27(A)), a grass object that grows on the ground or from the bottom of the virtual space (FIG. 27(B)), or firework directed toward the top from the bottom in the virtual space. In addition, a sound production, an oscillation production, an animation production, and the like, associated with the production of such objects, may be added. The sound production, for example, may be the sound of the blasted firework or a sound effect of clinking wine glasses together, or may be a voice such as instrumental interlude or shout used in Kabuki or the like. At this time, in the case of performing a manipulation such as setting the virtual item to be subjected to the commitment to be transparent, it is also possible to perform a production in which only a sound is subjected to the commitment as a virtual item. In addition, similarly, a signal for operating an oscillation function may be transmitted to the distributor terminal and/or the viewer terminal at the time of the commitment of the virtual item, and the oscillation production may be added to the commitment of the virtual item.

Physical calculation may be used in the control of the virtual item, and for example, it is possible to perform a production in which a fallen virtual item rebounds from the other object or the ground, a production in which the virtual item is broken by impact or the like and the hidden other object pops up, a production in which wine glasses subjected to the commitment are piled up to form a wine glass tower, a production in which a falling virtual item collides with a blowing virtual item, and various productions of holding, manipulating, or throwing the virtual item by using the avatar.

In addition, another example of the virtual item is not merely a symbol, but can be a virtual item having a special function or effect, which is used for a specific object. As an example of the function, for example, in a case where the virtual item having a blast function such as a bomb is subjected to the commitment, the function can be a function of blasting the other virtual item, the object, the avatar, and the like after a certain period of time or by a predetermined trigger to be blown off or to disappear, or in a case where a virtual item having a moving function such as a living object or a machine is subjected to the commitment, the function can be a function of pressing the other virtual item, the object, the avatar, and the like or of causing a mutual interaction by the behavior of the virtual item.

In addition, another example of the virtual item may be clothes, a ride, a building, a background, a small space occupying a part of the virtual space, and the like, and by using such virtual items, for example, it is possible to perform a production in which the avatar wears a costume subjected to the commitment as a virtual item, a production in which the avatar enters the building subjected to the commitment, a production in which the background subjected to the commitment is displayed as the background of the virtual space or as a part thereof, or a production in which the background of a special photograph or the like or a decorated small space such as a photographic frame (not limited to a three-dimensional space, but including a plane, a curved surface, and a segment) is subjected to the commitment as a virtual item, and the avatar enters the frame, and thus, the avatar performs image distribution from another field angle cut from another image.

In addition, another example of the virtual item may be a virtual item in which the contents set at the time of the commitment of the commitment person or set in advance are reflected, but not a virtual item in a format set in advance. The set contents, for example, can be the contents of letters described in the virtual item, the color or the pattern of the virtual item, the shape of a part of the virtual item or the entire virtual item, the contents of the movement of a dynamic virtual item, the type of function of a virtual object having a function, the combination contents of single virtual items in a virtual item group in which a plurality of virtual items can be subjected to the commitment as a set, and the like. In addition, such set contents may be changed by the manipulation of the commitment person or a predetermined trigger, and even in a virtual item already subjected to the commitment in the broadcasting program or a virtual item subjected to the commitment in an image of the past, the set contents may be changed by the manipulation of a person having suitable authority or a predetermined condition.

In addition, another example of the virtual item may be a virtual item in which additional information such as various numerical value data items included in information of the commitment person or item data is displayed. The additional information, for example, can be user information of the commitment person of the virtual item, a numerical value of a point necessary for obtaining the virtual item subjected to the commitment, a numerical value of a point that is given to the distributor or the broadcasting program, in accordance with the commitment of the virtual item, evaluation of the other viewer or the distributor with respect to the virtual item subjected to the commitment or the commitment person of the virtual item, and the like. In addition, a display part of the additional information, for example, can be the surface or the vicinity of the virtual item subjected to the commitment, an arbitrary location inside and outside the virtual space, associated with the virtual item subjected to the commitment, another tag, inside another window, and the like. In addition, the various numerical value data items may be a numerical value relevant to the commitment of each of the virtual items, or a numerical value relevant to the commitment of a plurality of virtual items belonging to an arbitrary category (for example, also including a sum, an average, a ranking, and the like).

In addition, another example of the virtual item may be a virtual item having a counting function such as a vote. For example, in broadcasting in which there are a plurality of distributors, a popularity vote between the distributors, performed by the commitment of the virtual item of the viewer with respect to the own favorite distributor may be another example of the virtual item. In such broadcasting, it is possible to obtain a vote result by counting the total number of virtual items subjected to the commitment with respect to each of the distributors, a total value of various numerical value data items that are the additional information of the virtual item, or the like. In addition, a method at the time of designating to which distributor the viewer performs the commitment of the virtual item, for example, may be a method of giving an option to which distributor the commitment of the virtual item is performed at the time of performing the commitment of the virtual item or in advance, or may be a method in which when a dedicated virtual item of each of the distributors can be obtained and the dedicated virtual item is subjected to the commitment, the commitment is converted as the commitment of the virtual item with respect to the corresponding distributor. Further, the method may be a method in which a person performing the commitment of the virtual item may designate a commitment position, a movement direction, a track, or the like of the virtual item, or a method in which the virtual item is moved in the virtual space, in accordance with such designation, and thus, it is determined that a vote with respect to the contact avatar is performed.

In addition, another example of the virtual item may be a virtual item having a function of accepting the obtainment of the virtual item corresponding to an actual product or the purchase of the actual product on the basis of a commitment record.

In addition, as an example of a commitment method of the virtual item, as described above, the method has been described in which the person performing the commitment designates the commitment position, the movement direction, the track, or the like of the virtual item, but the commitment method is not limited thereto, and for example, a position in which the commitment can be performed, a movement method, a track, or the like may be set in advance for each virtual item. For example, a virtual item having required more points to be obtained may be preferentially subjected to the commitment in the center area of the virtual space.

In addition, as an example of the production of the virtual item, the virtual item subjected to the commitment may be changed after a certain period of time or by a predetermined trigger. For example, a production in which the virtual item decreases in 10 seconds after the commitment, a production in which when the virtual items are piled up, the virtual items collapse to be small, a production in which the virtual item gradually becomes transparent and disappears, and a production in which when a certain number of virtual items or more are accumulated, the virtual items are broken into small pieces can be performed. According to such a production, for example, in a case where a volume of virtual items or a large virtual item are subjected to the commitment, the avatar that is manipulated by the distributor is hidden by the virtual item, and thus, it is possible to avoid a situation in which the amusingness of the distribution is reduced.

In addition, an example of the production of the virtual item may be a production in which the virtual item subjected to the commitment is displayed on a part of the distributor terminals and/or the viewer terminals, and is not displayed on the other distributor terminals and/or viewer terminals. For example, the production may be a production in which the virtual item subjected to the commitment is displayed on a terminal of a viewer who performs the commitment of the virtual item, but is not displayed on a terminal of the other viewer, in accordance with the viewer. According to such a production, for example, it is possible to respond to a request of the viewer who wants to check the virtual item subjected to the commitment by the viewer but to avoid a situation in which the avatar of the distributor is not viewed by being buried in the virtual item viewed. In addition, the production may be a production in which the virtual item subjected to the commitment by the viewer is displayed on the distributor terminal, but is not displayed on all of the viewer terminals. According to such a production, for example, it is possible to respond to a request of the viewer who wants to represent the praise with respect to the distributor but to avoid a situation in which an element of the broadcasting program is disrupted by a volume of virtual items. In addition, the setting of such a production may be performed before the broadcasting of the broadcasting program, or may be determined and changed during the broadcasting. In addition, the setting of such a production may be manipulated by the distributor terminal, or may be manipulated by the viewer terminal.

In addition, an example of the control of the virtual item may be control in which the number of virtual items subjected to the commitment is limited. For example, in the broadcasting of one broadcasting program, there may be an upper limit in the number of virtual items capable of being subjected to the commitment. In addition, even after the maximum number of virtual items are subjected to the commitment, the virtual items that can be subjected to the commitment again may be filled after a certain period of time has elapsed or by satisfying a certain condition. According to such control, for example, it is possible to avoid a situation in which only one type of virtual item is unevenly subjected to the commitment with respect to one broadcasting program, and to create an environment in which various virtual items are uniformly subjected to the commitment.

In addition, an example of the control of the virtual item may be control of limiting a time for which the virtual item can be subjected to the commitment or an area in the virtual space in which the commitment can be performed. For example, the control may be control in which when the elapsed time counted from the start of the broadcasting of the broadcasting program is within a predetermined elapsed time, the commitment of the virtual item is inhibited or is partially limited. In addition, for example, the control may be control in which the commitment of the virtual item is temporarily inhibited or is partially limited, on the basis of the manipulation of a person with authority. Further, the control may be control in which with reference to the number of virtual items subjected to the commitment in the broadcasting program, the total area occupied by the virtual item, or other parameter, in a case where it is determined that the parameters are greater than a predetermined threshold value, the commitment of the virtual item is inhibited or is partially limited. In addition, for example, the control may be control in which the virtual space is divided into arbitrary areas, and with reference to the number of virtual items subjected to the commitment for each area, the total area occupied by the virtual item, or the other parameters, in a case where it is determined that the parameters are greater than the predetermined threshold value, the commitment of the virtual item is inhibited or is partially limited in the area. In addition, the control may be control in which when the parameters of the virtual item of the commitment, as described above, through the entire broadcasting program, are greater than the predetermined threshold value, the commitment of the other virtual items is not capable of being performed in a certain area of the virtual space (for example, an area in which the avatar exists), and the commitment of the other virtual items is permitted in the other areas (for example, areas in which the avatar does not exist). According to such control, it is possible to avoid a situation in which an element of the broadcasting program is disrupted by the commitment of a volume of virtual items.

Figure 29:
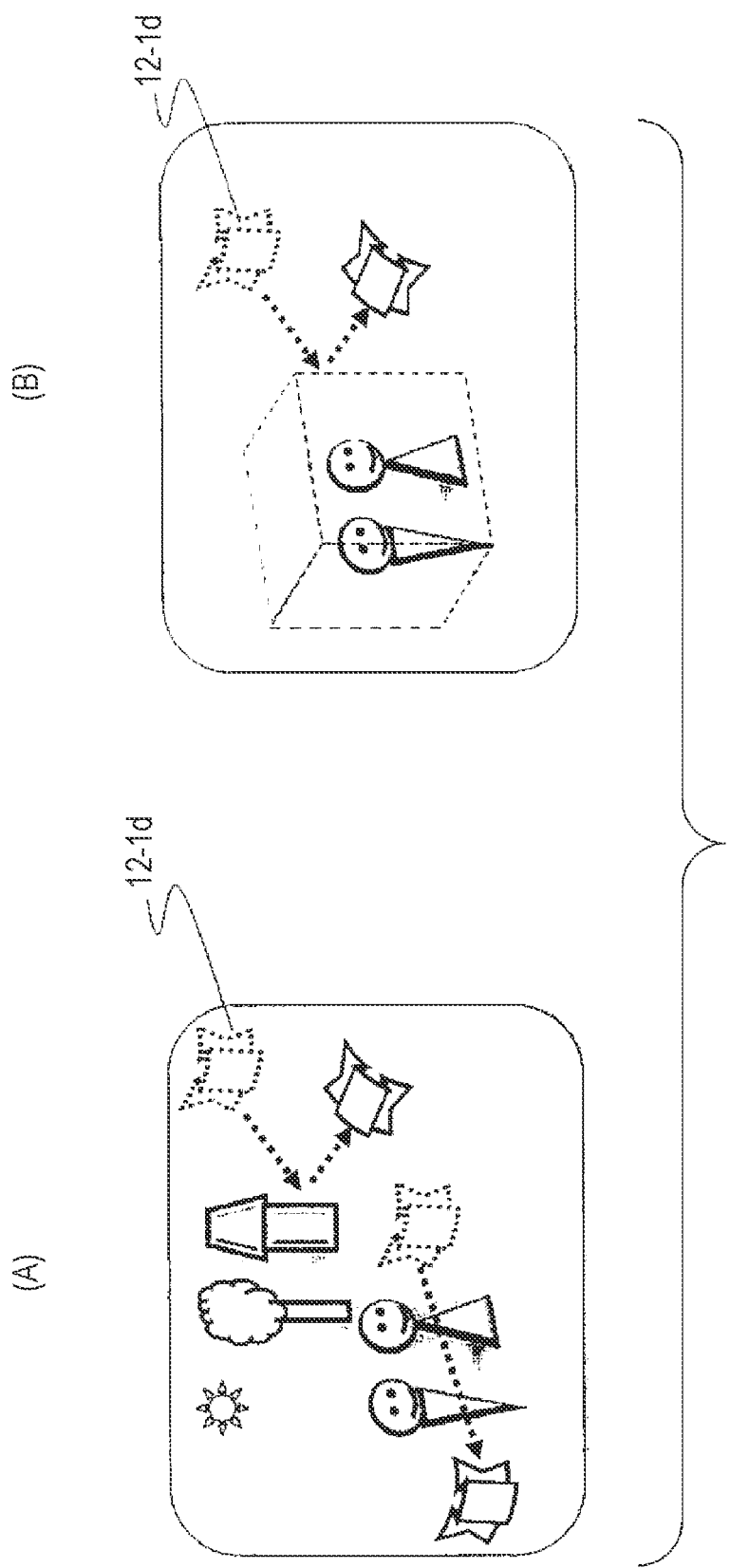
FIG. 29 is a schematic view illustrating another aspect of the virtual item for commitment, in the content distribution receiving system of the present invention.

In addition, an example of the control of the virtual item may be control in which the virtual item does not hit the avatar. For example, the virtual item is set such that a physical mutual interaction occurs with respect to the other object, and the virtual item passes through only the avatar (FIG. 29(A)). In addition, for example, there is a transparent wall around the avatar, and the virtual item subjected to the commitment hits the transparent wall and bounces off, and thus, it is possible to perform setting such that the virtual item does not hit the avatar (FIG. 29(B)). According to such control, it is possible to avoid a situation in which an element of the broadcasting program is disrupted by the virtual item hitting the avatar.

In addition, an embodiment in which the measure on the production of the virtual item to be subjected to the commitment is performed will be further described by including respects partially overlapping with the above description.

In consideration of the configuration of performing the commitment of the virtual item in the three-dimensional virtual space in the system 1 of this example, a method that is implemented by the system is a method for performing moving image broadcasting from the server toward an unspecific viewing terminal through a network by using the three-dimensional virtual space as a target of drawing and transmission, and the method includes a step in which a drawing unit of the server performs drawing such that the commitment of the virtual object is performed in the three-dimensional virtual space, on the basis of a request from the viewing terminal, and the virtual object or the commitment operation of the virtual object has the following characteristics on the production.

Figure 30:
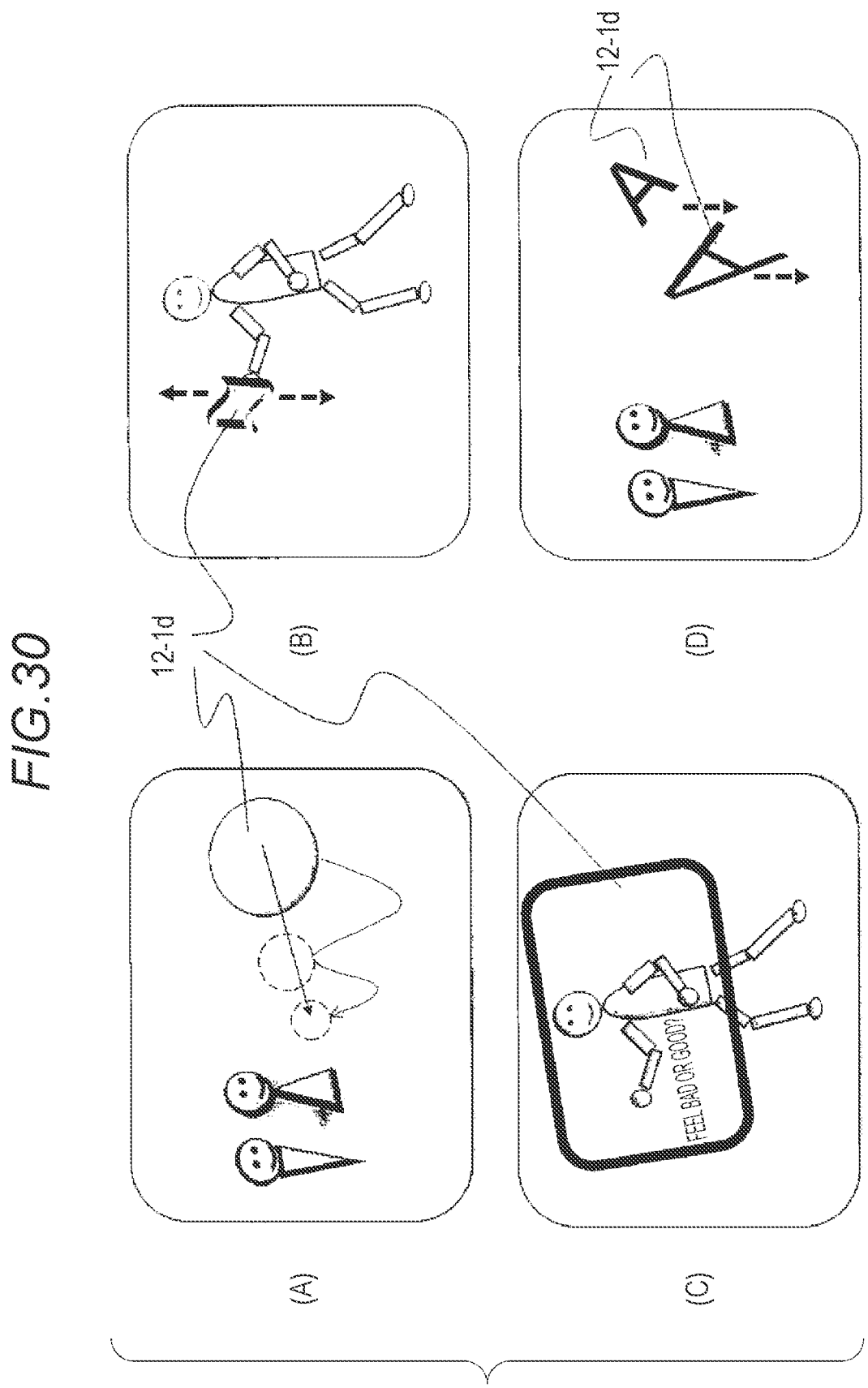
FIG. 30 is a schematic view illustrating another aspect of the virtual item for commitment, in the content distribution receiving system of the present invention.

(A) A production in which the virtual object to be subjected to the commitment performs a mutual interaction with any virtual object in the three-dimensional virtual space, by imitating a physical action between actual objects in an actual space (FIG. 30(A) and FIG. 30(B)) . . . . For example, the production is a production in which when the virtual object is a rubber ball, the rubber ball subjected to the commitment in the virtual space hits the ground in the virtual space and bounces off. Alternatively, the production includes a collision between the virtual objects, elastic rebound after the collision, and the modification or the breakage of the virtual object by the collision. The viewer is capable of enjoying a realistic feeling.

(B) A production in which a human avatar object in the three-dimensional virtual space is in contact with the virtual object subjected to the commitment . . . . In the example of the rubber ball described above, the production is a production in which the rubber ball that is a virtual object hits the avatar in the virtual space and bounces off, or the avatar kicks the rubber ball, in which it is also possible to have a realistic feeling.

(C) A production in which the virtual object subjected to the commitment is an image frame in which an image is drawn, and a human avatar in the three-dimensional space is drawn in the image frame (FIG. 30(C)) . . . . In a case where there is a target performer subjected to the commitment by the viewer, in a photographic frame, the target performer is zoomed in, and thus, there is an effect that both the performer and the viewer performing the commitment are remarkable. A letter may be input into the frame.

(D) A production in which ranking information of the viewer terminal performing the commitment is displayed on the display screen of the viewing terminal . . . . The production is a production in which the viewer who often performs the commitment in the broadcasting program, the performer who often becomes a commitment target, or the like is displayed on a part of a moving image broadcasting screen, and thus, a so-called sense of exaltation of "general election" and a motivation for performing the commitment are enhanced.

Figure 28:
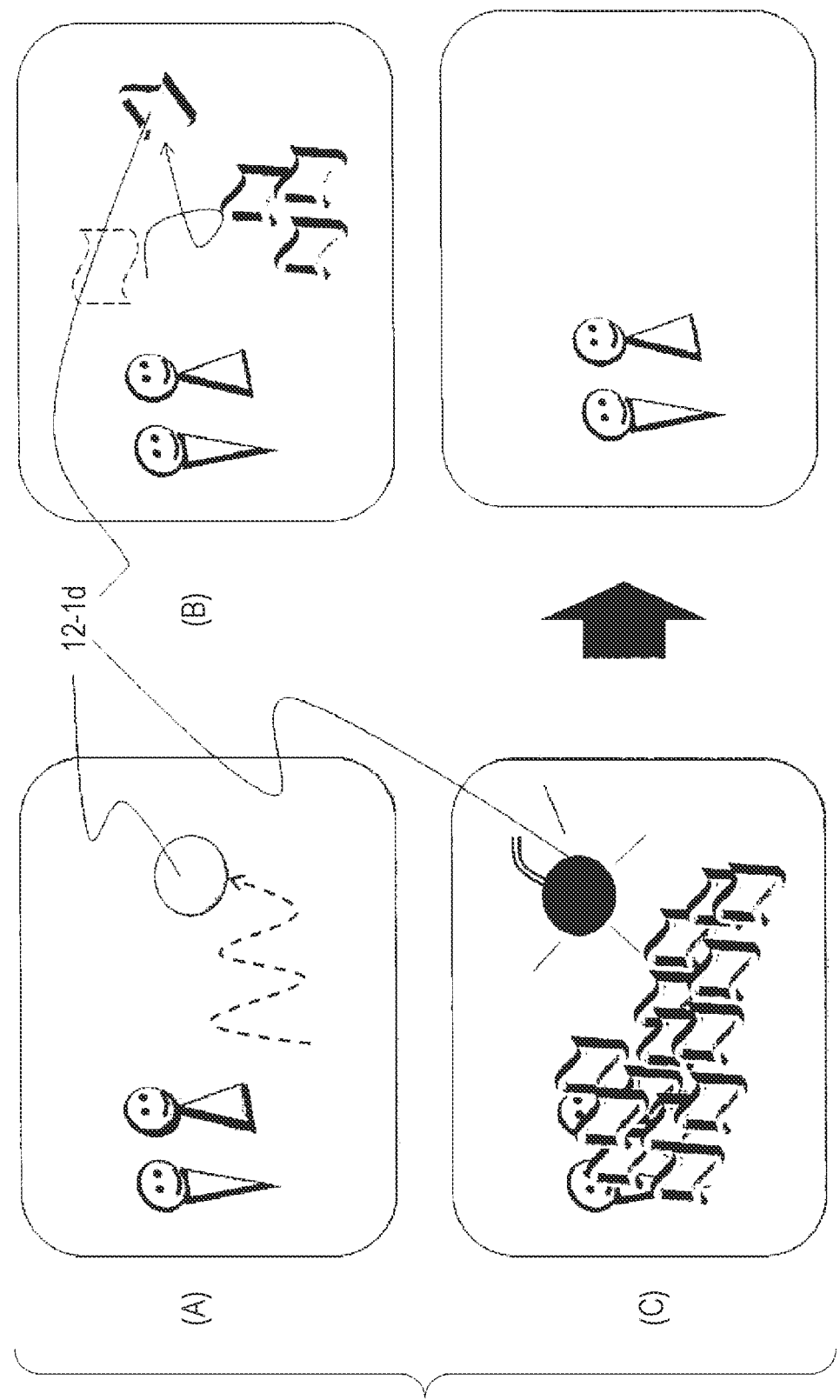
FIG. 28 is a schematic view illustrating another aspect of the virtual item for commitment, in the content distribution receiving system of the present invention.

(E) A production in which a new virtual object that is a factor for the other virtual objects already subjected to the commitment to disappear is subjected to the commitment, on the display screen of the moving image broadcasting . . . . The commitment is also a popularity vote, and thus, the commitment may be concentrated on a popular moving image broadcasting program, and a popular section or scene, and a popular performer in the broadcasting program. In this case, as illustrated in FIG. 28(C), the moving image broadcasting screen is fully filled with the virtual items subjected to the commitment, and thus, it is not possible to enjoy the original broadcasting screen. Therefore, for example, the production is a production in which a bomb-type virtual item is subjected to the commitment to be blasted, and thus, the other virtual items are cleaned out. There is an element of surprise or an element of battle, and entertainment is appealed.

(F) A production in which the virtual object subjected to the commitment is moved to a direction away from the viewpoint in the three-dimensional virtual space (FIG. 30(A)) . . . . As described above, the production is a production in which a realistic feeling and a sense of immersion are imparted by using the fact that the virtual space is a three-dimensional space. On the contrary, a configuration is also considered in which the virtual item pops up to the near side from the depth side.

(G) A production in which the virtual object to be subjected to the commitment is associated in advance with each target person in connection with the broadcasting, and display is performed for each target person or the attribute is changed, in accordance with the commitment . . . . For example, the performer is an idol group, commitment items different for each member of the group are prepared, and the viewer selects a dedicated item of the own favorite member. This is a type of popularity vote, and thus, it is possible to enjoy a sense of competition and game feeling. In addition, there is merit that when the commitment item is accompanied by an actual gift, it is possible to distribute the gifts in the members of the group.

(H) A production in which voice display is performed in accordance with the execution of the commitment or the movement of the virtual object after the commitment . . . . In a case where the virtual object is firework, a plosive sound is produced, or when the virtual item hits the ground, a sound is produced. It is also considered that in the case of an animal-type item, a crying sound is produced.

(I) A production in which each of the virtual items capable of being used in the commitment is displayed in advance on the display screen of the broadcasting . . . . There are a plurality types of virtual items, and the virtual items are displayed as a menu on the side of the broadcasting screen to be selected in a menu format. In a case where the type of virtual item is changed for each broadcasting program, is changed daily, or is randomly changed, a game element comes out.

(J) A production in which the virtual item capable of being used in the commitment symbolizes a product, the purchase of the product is established by the commitment . . . . It is considered that the commitment of the virtual item is originally started from the support or the praise with respect to the broadcasting program or the performer (so-called "Ohineri (wrapped offering)"), and a service of high value is performed by using such a mechanism or system. In this production, as with online shopping, a product is selected on the broadcasting screen, and the commitment of the selected virtual item is performed as the expression of intention of the purchase, but it is not just a purchase but a feeling of participation in the broadcasting program, and the product may be explained in the broadcasting program, and thus, the production can be a business of high value.

(K) A production in which letter information that is designated by the viewer who performs the commitment of the virtual item to be subjected to the commitment is displayed . . . . The posting of the comment with respect to the moving image broadcasting program has been already performed, but in the production, the posting is expanded to a commitment service of the virtual item. Since the letter information is displayed, a game feeling and a participation feeling are further enhanced after the expression of intention of the commitment person is performed.

(L) A production in which the virtual item to be subjected to the commitment has an outer shape of a letter (FIG. 30(D)) . . . . There is amusingness that a letter itself falls from the top.

(M) A production in which the virtual object capable of being subjected to the commitment is different in accordance with the broadcasting program to be subjected to the moving image broadcasting . . . . The setting of a virtual item based on the contents of the broadcasting program leads to the excitement of the broadcasting program itself.

(O) A production in which the virtual item to be subjected to the commitment is a daily item . . . . The commitment of the item is the support, the praise, or the like, and thus, in general, articles having a gift-giving feeling such as flowers or a trophy are often used, and famous architectural structures, towers of a landmark, or the like, are also often used. In contrast, in a case where daily items such as a washing machine and a refrigerator are used as articles having an element of surprise, which is not used for the above purpose, there is an element of surprise, which leads to excitement or appeal.

(P) A production in which each of the virtual items to be subjected to the commitment has an upper limit number that can be subjected to the commitment . . . . It has been described that the commitment is concentrated on a popular broadcasting program or the like, but in a case where there is an upper limit in the number of times of the commitment, it is possible to prevent an excessive concentration, and it is also possible to maintain a commitment motivation from a rarity feeling.

(Q) A production in which the human avatar object in the three-dimensional virtual space holds the virtual object subjected to the commitment (FIG. 30(B)) . . . . In a case where the avatar is moved by holding the virtual item subjected to the commitment, there is a feeling as if the performer receives "Ohineri (wrapped offering)", and thus, a sense of achievement of the commitment can be obtained.

(R) A production in which the virtual item subjected to the commitment disappears after a predetermined period of time has elapsed from the commitment . . . . As described above, an excessive commitment concentration is prevented, which leads to a motivation for continuously performing the commitment.

(S) A production in which an appearing position of the virtual item subjected to the commitment in the three-dimensional virtual space and/or the performance after the appearance are different in accordance with the attribute of the viewer performing the commitment . . . . There is a business operator dividing members of the video distribution (broadcasting) service into paid members and free members, and in order to treat the paid members or premium members preferentially, items subjected to the commitment by such members appear in front of the virtual space to be remarkable or appear near the performer, or a falling speed of the items is slowed down.

(T) A moving image broadcasting system performing the moving image broadcasting from the server to each of the viewing terminals through a network by using the three-dimensional virtual space as the target of drawing and transmission, the system including a drawing unit performing the commitment and the drawing of a new virtual object in the three-dimensional virtual space, on the basis of a request from the viewer terminal, and a simulation calculation unit simulating a physical mutual interaction in the case of assuming that the existing virtual object already included in the three-dimensional virtual space and a virtual object to be newly subjected to the commitment are the actual object in the actual space, to reflect the result of the simulation in the drawing of the drawing unit . . . . As described above, the commitment virtual item may elastically rebound (bound) due to a collision with respect to the existing virtual item, and any one or both of the items may be described as being modified or broken inelastically. Alternatively, while both of the items are not in contact with each other, the items may rebound each other by the action of a magnetic field or an electric field, and may change the track traveling in the space.

(U) A moving image broadcasting system performing the moving image broadcasting from the server toward each of the viewing terminals through a network by using the three-dimensional virtual space as the target of drawing and transmission, the system including a drawing unit performing the commitment and the drawing of a new virtual object in the three-dimensional virtual space, on the basis of a request from the viewer terminal, and a user interface unit performing manipulation instruction for performing a commitment manipulation used in the viewer terminal and/or information display based on the result of each commitment performed in advance by using each of the viewer terminals, with respect to the virtual object capable of being subjected to the commitment . . . . There is a method in which the virtual items that can be subjected to the commitment by the viewer are displayed in a row on the side of the display screen to be selected, there is also a method for including the commitment by representing information of the type of desired item and a desired time by performing the commitment as the broadcasting program, and insofar the name or an online name of the viewer with the largest number of times of the commitment and the largest number of points is displayed on the side of the screen, as a ranking of the items already subjected to the commitment, it can be an incentive.

(V) A moving image broadcasting system performing the moving image broadcasting from the server toward each of the viewing terminals through a network by using the three-dimensional virtual space as the target of drawing and transmission, the system including a drawing unit performing the commitment and the drawing of a new virtual object in the three-dimensional virtual space, on the basis of a request from the viewer terminal, and an attribute determination unit changing at least any one of the availability of the commitment, a commitment mode, and a display mode after the commitment, in accordance with the attribute imparted in advance to at least any one of the viewing terminal to be used in the commitment, the viewer performing the commitment, and the virtual object to be used in the commitment, to be reflected in the drawing . . . . For example, in the moving image distribution service in which participation is basically free, in a case where only the paid members or the premium members are capable of performing the commitment of the item, a remarkable item different from the item of the free member is subjected to the commitment, or in the display screen of the virtual space, and the commitment can be performed such that the item is displayed in the foremost remarkable position, a motivation for joining the premium member is improved, and thus, it is possible to contribute to a business profit of the video distribution service. Such differentiation may be performed by the account of the video distribution service, or may be performed by a unique number of a registered terminal or the like (a personal computer or a smart phone, and a tablet terminal), and the number of a communication terminal (an IP address or the like). In addition, it may be a method in which for the virtual object, for example, an item that recommends the commitment for each broadcasting program or an item that prohibits the commitment is set, and the progress of the broadcasting program smoothly proceeds. In addition, in the case of performing different control in accordance with the attribute such as the type of viewer, viewer terminal, and virtual item, as described above, a difference in the locations appearing on the screen, a difference in flying modes in the virtual space, a difference in the length of time for appearance and continuation, and the like may be used as the behavior of the item after the commitment, in addition to the availability of the item commitment.

(W) A server including a distribution unit distributing a live content in which the intervention of the viewer is allowed, a storage unit storing information for implementing the intervention of the viewer, a transmitting unit transmitting the information to the terminal of the viewer, a receiving unit receiving an implementation request of the intervention from the terminal, and a display control unit synthetically displaying electronic item on an image of the live content, on the basis of the implementation request in a case where the implementation request of the intervention is received, and in a case where a predetermined condition is satisfied, the display control unit limits the intervention of the viewer . . . . As described above, it is a method of inhibiting the subsequent commitment in a case where the number of times of the commitment of the virtual item reaches a predetermined limit or of limiting a time for the commitment of the virtual item.

Here, a configuration for attaining various productions of the commitment virtual item, as described above, will be described again, with reference to FIG. 31 describing the configuration or the like of the content distribution server 2.

As described above, each virtual item used in the commitment has a distinctive appearance and performs a distinctive motion. In addition, some virtual items are capable of performing a continuous motion such as contact, with respect to the avatar, the other virtual item, or the other item in the virtual space. Therefore, there are various advantages insofar as such virtual items have the same data as the avatar described above or have a configuration for the rendering.

As an example, the information relevant to the virtual item is stored in a virtual item storage unit 53 of the content distribution server 2, a virtual item is selected by manipulating a viewer terminal 56, a commitment accepting unit 52 of the server 2 receives the selected signal, the signal (the appearance and the motion) of selected virtual item is sent to a distributor terminal 57 through a motion data transmitting unit 55, the rendering is performed in the distributor terminal 57, along with the information of the other item or avatar, and the virtual item is sent to the viewer terminal 56 through an image data receiving unit 50 and an image data transmitting unit 51 of the server 2, to be provided for the viewing of the moving image broadcasting program.

As another method, in a case where the viewer performs the commitment of the own original virtual item, the information of the virtual item may be prepared in advance in the viewer terminal 56, and may be sent to the distributor terminal 57 through the server 2 such that the rendering is performed.

Alternatively, the information of the virtual item may be prepared in the distributor terminal 57.

In addition, the rendering may be performed by the distributor terminal 57, or may be performed by the viewer terminal 56 or the server 2.

According to the present invention, it is possible to provide a content distribution system, content distribution method, and a program, in which it is possible to obtain the commitment of a virtual item that is a symbol of support with respect to a live content from a wider range of target people not limited to a viewer of a live content that is a target, it is possible for a wider range of target people not limited to the viewer of the live content to visually recognize the virtual item that is the symbol of the support, and it is possible to make the circle of support with respect to the live content widespread.

The present invention can be implemented in various other forms, and various omissions, substitutions, and changes can be made within a range not departing from the gist of the present invention. The embodiments and modifications thereof are included in the scope of the present invention described in the claims and the equivalent scope thereof, as well as in the scope and gist of the present invention.

The invention claimed is:

1. A content distribution server, comprising a processor and memory configured to perform:

a common distribution accepting process, by accepting an application of common distribution with respect to a virtual space that is used in distribution by a distributor of a live content, from a distributor of other live content;

a motion information storage process, by storing motion information that is data obtained by sensing a movement of each part of a body of each of the distributor of the live content and the distributor of the other live content, and information of each of a plurality of virtual characters;

a content distribution process, by distributing images of the virtual space and each of the virtual characters to a plurality of viewers of the live content and a plurality of viewers of the other live content, on the basis of each of the information items stored in the motion information storage unit; and a commitment item accepting process, by accepting commitment of a plurality of new virtual items with respect to the virtual space by each of the viewers, wherein each of the new virtual items is selected by one of the plurality of viewers of the live content and the plurality of viewers of the other live content, and wherein each new virtual item is sent from one viewer of the live content or viewer of the other live content to the distributor of the live content or the distributor of the other live content;

wherein the distribution of the virtual space and each of the virtual characters is performed by including an image of the new virtual item subjected to the commitment, and wherein the new virtual item subjected to the commitment includes motion information.

2. The content distribution server according to claim 1, wherein the new virtual item subjected to the commitment includes motion information that is movement information, and the motion information is used in the distribution performed by the content distribution process.

3. The content distribution server according to claim 2, wherein the motion information that is the data obtained by sensing the movement of each part of the body of each of the distributor of the live content and the distributor of the other live content, and the new virtual item subjected to the commitment are stored by the motion information storage process.

4. The content distribution server according to claim 1, wherein the content distribution process distributes the images on the basis of the movement of one or more body parts of the distributor of the live content and the distributor of the other live content.

5. The content distribution server according to claim 1, wherein the motion information of the commitment item further comprises at least one of position information, a direction and speed of a movement, posture information, sound information, and oscillation information.

6. A content distribution method of a content distribution server, comprising:
    accepting an application of common distribution with respect to a virtual space that is used in distribution by a distributor of a live content, from a distributor of other live content;
    storing motion information that is data obtained by sensing a movement of each part of a body of each of the distributor of the live content and the distributor of the other live content, and information of each of a plurality of virtual characters;
    distributing images of the virtual space and each of the virtual characters to a viewer of the live content and a viewer of the other live content, on the basis of each of the information items stored in a motion information storage unit; and
    accepting commitment of a plurality of new virtual items with respect to the virtual space, wherein each new virtual item is selected by each of the viewers,
    wherein the distribution of the virtual space and each of the virtual characters is performed by including an image of each of the new virtual items subjected to the commitment, and wherein each of the new virtual items subjected to the commitment includes motion information.

7. The content distribution method of a content distribution server according to claim 6, wherein the new virtual item subjected to the commitment includes motion information that is movement information, and the motion information is used in the distribution performed when distributing images of the virtual space and each of the virtual characters to the viewer of the live content and the viewer of the other live content.

8. The content distribution method of a content distribution server according to claim 7, wherein the motion information that is the data obtained by sensing the movement of each part of the body of each of the distributor of the live content and the distributor of the other live content, and the new virtual item subjected to the commitment are stored by the motion information storage unit.

9. A computer program product embodied on a non-transitory computer readable medium for distributing content of a content distribution server, containing program code that, when executed on a processor, causes the processor to perform steps of:
    accepting an application of common distribution with respect to a virtual space that is used in distribution by a distributor of a live content, from a distributor of other live content;
    storing motion information that is data obtained by sensing a movement of each part of a body of each of the distributor of the live content and the distributor of the other live content, and information of each of a plurality of virtual characters;
    distributing images of the virtual space and each of the virtual characters to a viewer of the live content and a viewer of the other live content, on the basis of each of the information items stored in a motion information storage unit; and
    accepting commitment of a new virtual item with respect to the virtual space, wherein each new virtual item is selected by each of the viewers,
    wherein the distribution of the virtual space and each of the virtual characters is performed by including an image of each of the new virtual items subjected to the commitment, and wherein the new virtual items subjected to the commitment include motion information, and the motion information is used in the step of distributing images of the virtual space and each of the virtual characters.

* * * * *